INVENTOR
HENRY A. REITFORT
BY William N. Sund Jr.
ATTORNEY

Jan. 7, 1964 H. A. REITFORT 3,117,306

MULTIPLEX COMPUTER INQUIRY STATIONS

Filed Feb. 17, 1958 21 Sheets-Sheet 3

MULTIPLEX COMPUTER INQUIRY STATIONS

Jan. 7, 1964 H. A. REITFORT 3,117,306

MULTIPLEX COMPUTER INQUIRY STATIONS

Filed Feb. 17, 1958 21 Sheets-Sheet 8

Jan. 7, 1964 H. A. REITFORT 3,117,306

MULTIPLEX COMPUTER INQUIRY STATIONS

Filed Feb. 17, 1958 21 Sheets-Sheet 12

Jan. 7, 1964 H. A. REITFORT 3,117,306

MULTIPLEX COMPUTER INQUIRY STATIONS

Filed Feb. 17, 1958 21 Sheets-Sheet 14

United States Patent Office 3,117,306

Patented Jan. 7, 1964

3,117,306

MULTIPLEX COMPUTER INQUIRY STATIONS

Henry A. Reitfort, Vestal, N.Y., assignor to International Business Machines Corporation, New York, N.Y., a corporation of New York Filed Feb. 17, 1958, Ser. No. 715,669
3 Claims. (Cl. 340—172.5)

This invention relates to a data entry and reception apparatus for a stored program computer and in particular to a multiplex typewriter control for such a computer.

In the operation of a computer at a central location in a business or scientific laboratory, there is usually a fixed time schedule wherein the work to be performed on the computer is determined and programmed when the scheduled time arrives. In installations of this type, the amount of time that the computer spends on any given problem may be determined precisely and charged to the project for the hourly rate of the computer rental.

In a great many applications, the necessity of determining predetermined stored data in the computer storage or auxiliary apparatus is a periodic affair involving only a few instructions for addition or subtraction of the amount contained at the predetermined storage location or a few minor program steps for achieving a desired operation. Where there are a great many locations or departments having need to determine or control such information, the number of requests is large and to obtain efficiency in bookkeeping and current operations it is necessary that the computer be programmed for these immediate needs. In this relation, a few examples would be stock inventories where parts are being used and received so that a great many additions and subtractions are necessary; accounts receivable for debits and credits; and other procedures similar to this.

Since the time utilized in running a computer is costly and it is undesirable to interrupt programs already in existence or inefficient to wait until such a program has been completed, a need has been felt for a series of satellite stations located at various remote locations where the need for computer time is limited but where it is desirable that access be obtained to the main program of the computer at the earliest possible moment.

In the present invention, a system has been provided wherein a plurality of typewriters can enter information into or receive information from a central computer. As a further precaution and necessity, format control for each individual inquiry station is provided to insure that operator error is kept to a minimum while providing a selection process which is invariable for a given format but has a changeable format. The information from and to the inquiry station is routed via a magnetic drum buffer zone in the computer which is periodically scanned by the main program of the computer to determine the presence of an inquiry stored thereon. When such a scanning operation detects the presence of a completed inquiry, the computer transfers the information under control of input circuitry from the buffer zone to the general storage area of the computer wherein the subroutine program is determined by the format tape. The inquiry is processed and the reply formulated and routed back to an output buffer zone on the magnetic drum where subsequent operations cause the reply to be typed on the originating typewriter or one selected by the inquiry station or computer. When the information desired and obtained through the subroutine has been terminated, the main routine of the computer is resumed without any unnecessary lost time in computer programming time.

It is therefore an object of this invention to provide an improved data entry and reception apparatus for a stored program computer.

It is a further object of this invention to provide a data entry apparatus wherein a format control is provided for the entry of single digits of information at predetermined locations in a rotating magnetic storage in said computer.

Another object of this invention is to provide apparatus in which a multiple number of remotely located inquiry stations are provided for a stored program computer wherein each said station is selected according to a predetermined priority.

A further object of this invention is to provide apparatus to check the input to the computer digit by digit with information stored in a computer in response to the input to insure that the input information has been stored properly in the computer.

Another and further object of this invention is to provide a format control to enter a control word into a computer from the format tape and provide a lessened degree of operator error possibility.

Yet another object of this invention is to provide apparatus for checking completeness of entry of a control word into a computer to determine that there have been no omissions in the transmission of digit information.

Other objects of the invention will be pointed out in the following description and claims and illustrated in the accompanying drawings, which disclose, by way of examples, the principle of the invention and the best mode, which has been contemplated, of applying that principle.

*General Description*

Figure 1:
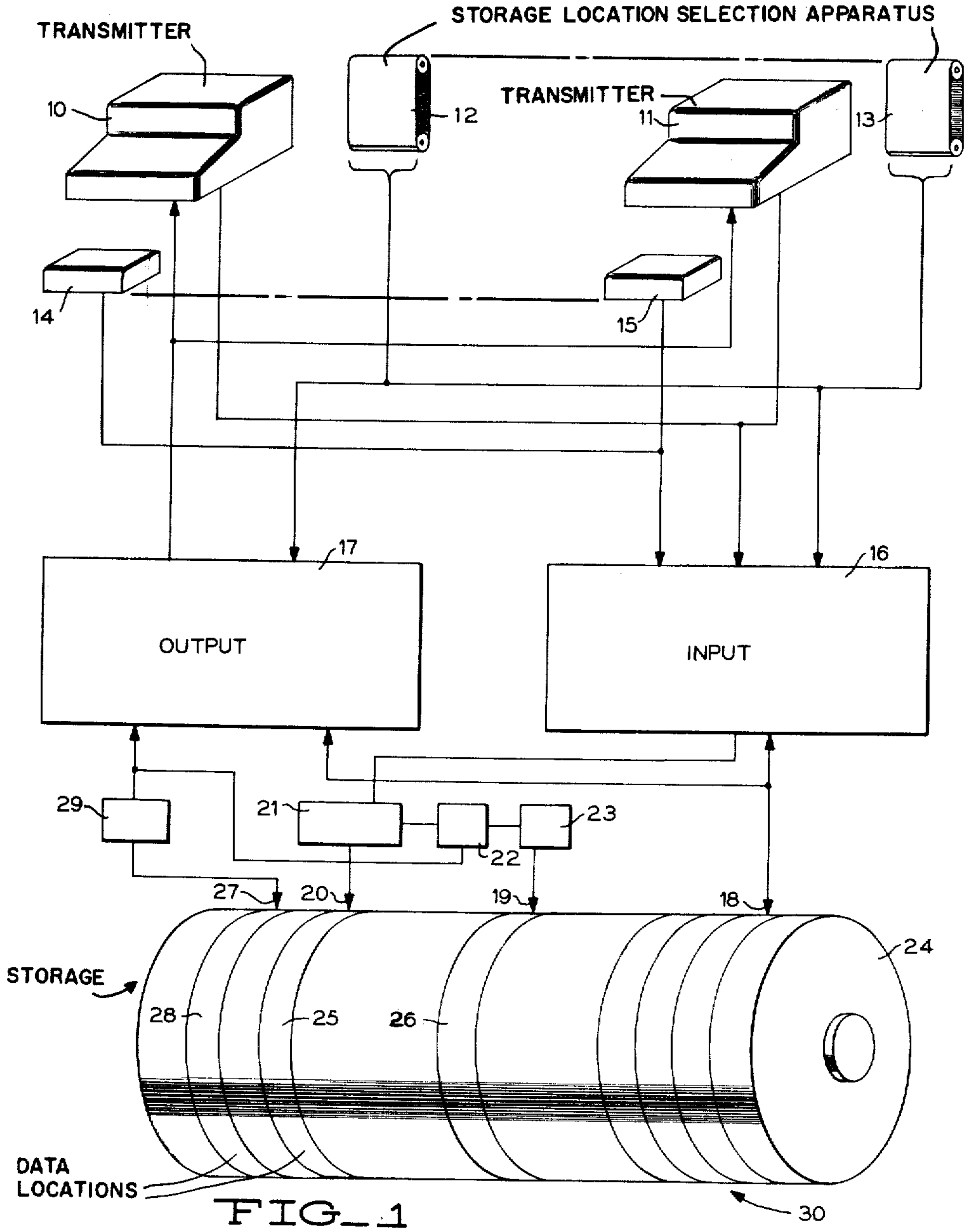
FIG. 1 is a schematic illustration of the invention.

The schematic illustration of FIG. 1 shows a plurality of typewriters connected to the input circuit of a magnetic drum computer, illustrated generally as the magnetic drum with corresponding heads shown thereon. It is seen that the typewriters are connected to the input so that the depression of the keys thereon will close circuits in said input to register the data sought to be stored in proper sequence and code combinations necessary for storage on the drum.

A plurality of format tapes are shown each associated with a particular typewriter. As will be described later, each format tape comprises a plastic tape with holes punched therein which are sensed by a plurality of reading brushes for selecting various circuits in both the input and output circuits. The format tape is used: to generate the control word for the inquiry to be transmitted to the computer; to store input data in the proper location; to insure proper operation of the typewriter; and to provide for a selected digit output from the output circuit to the selected typewriter key. A series of keys are shown provided for each typewriter which are utilized in certain operations not contained on said typewriter. In this regard, the initiation of a program or a request by an inquiry station for admittance to the buffer zone of the magnetic drum would correspond generally to the type of actuation which is contained therein.

The format tape for each inquiry station will be varied to suit the operation for which that particular station is designated. As a rule, each station will have a large variety of format tapes for many different types of operations. These tapes may be easily interchanged without trouble by the operator to suit the particular operation desired.

The information from each typewriter 10 and 11, the format control tapes 12 and 13, and the control switches 14 and 15 are multiplexed in an input circuit 16. From the circuit 16 which performs all the necessary translations, interlocking and timing, the output is taken to the reading and writing heads of the magnetic drum 24. The circuitry utilized in reading and writing is shown in application Serial No. 544,520, to F. E. Hamilton et al., filed November 2, 1955, now Patent No. 2,959,351, and has not been repeated in the instant application. A circuit 21 has been drawn to illustrate the fact that the output from input 16 is not directly to the drum 24.

The inpu code to the drum 24 is biquinary and contains seven possible digit positions of which the numeral positions have been tabulated below where "X" represents a bit.

| Decimal | $B_0$ | $B_1$ | $Q_0$ | $Q_1$ | $Q_2$ | $Q_3$ | $Q_4$ |
|---|---|---|---|---|---|---|---|
| 0 | X | 0 | X | 0 | 0 | 0 | 0 |
| X | | | | | | | |
| 1 | X | 0 | 0 | X | 0 | 0 | 0 |
| 2 | X | 0 | 0 | 0 | X | 0 | 0 |
| 3 | X | 0 | 0 | 0 | 0 | X | 0 |
| 4 | X | 0 | 0 | 0 | 0 | 0 | X |
| 5 | 0 | X | X | 0 | 0 | 0 | 0 |
| 6 | 0 | X | 0 | X | 0 | 0 | 0 |
| 7 | 0 | X | 0 | 0 | X | 0 | 0 |
| 8 | 0 | X | 0 | 0 | 0 | X | 0 |
| 9 | 0 | X | 0 | 0 | 0 | 0 | X |

The head 20 is therefore merely representative of the seven heads since all digit positions are written in parallel. The area 25 is called the input buffer and is not addressable except in the sense that data may be transferred from this input buffer to general storage illustrated as area 26. Area 25 in the use of this invention is used solely for input information storage from the typewriters.

As mentioned previously, area 26 designates general storage where data processing is achieved. Area 28 is the output buffer to which data is transferred from general storage for reply operation of the typewriter.

The circuits 22 and 29 illustrated as being placed between areas 25 and 26 and 28 are part of the computer proper since information is regularly transferred from one area to another in response to program instructions carried on the magnetic drum.

The head 18 is shown adjacent a zone 30 which contains the timing tracks for determining the location of the individual digits on the drum. Each track or zone contains fifty words of information broken down into sectors S0–S4 of ten words each. Each word W1–W10 contains ten digits D1–D10 and two digit places designated $D_X$ and $D_0$ which are used for timing purposes and sign control, respectively. Area $D_X$ does not usually have a digit entered therein while a decimal nine represents plus in $D_0$ while a decimal eight represents minus. The order in which these digit positions occur is: $D_X$, $D_0$, $D_1$, $D_2$, etc., $D_{10}$. Each time the drum revolves it can be seen that there will be one each of sector pulses S0–S4; five word pulses each of W1–W10 and fifty digit pulses each of D1–D10. With this arrangement then, it is possible to detect any desired digit position on the drum 24. A schematic illustration of these timing pulses can be seen in Patent No. 2,798,554 to C. B. Smith.

In the storage of data on track 25, the sector S0 or words W1–W10 are used. The output buffer zone stores data in words 27–36 or in other terminology sector 2, word 7 through sector 3, word 6. In speaking of storage of data in the input and output buffer zones, it is necessary that it always be remembered that the locations referred to are the positions in general storage 26 which the data on tracks 25 and 28 will be located when transferred. In actuality, the physical locations of the data in the input and output buffer zones are displaced peripherally from the word locations referred to above.

In explanation of this apparent anomaly, there is a delay in the transfer of data from general storage to output buffer of one digit time and from input buffer to general storage of two digit times. To record in the input buffer in such a manner that data from input buffer to general storage will arrive on time, it is necessary that the data in input buffer storage be gated two digits early to compensate for the delay. In selecting data from the output buffer, it is necessary to introduce a one digit delay in the selection process in order to obtain the digit desired.

The output circuit 17 is responsive to the timing pulses from head 18 along with the information from output buffer 28 and the format tapes 12 or 13 to select a particular digit on the drum and actuate the typewriter key indicated by said data.

The delay referred to above is introduced when writing digits on the magnetic drum. Since there will be one digit delay from the input to the input buffer and one digit delay from input buffer to general storage, the two digit delay is merely a sum of the two.

The keyboard communication to the computer system, provided by the typewriter units, begins with the operator requesting permission to send the inquiry or data to the computer. The computer signals the inquiry operator to proceed. The Proceed signal is given immediately upon determination that the input buffer is free to accept an inquiry. The Proceed signal unlocks the typewriter keyboard and the message is typed and placed on the drum one character at a time. This operation also provides a visual verification by the operator. Should an error be detected, the entire message can be cancelled by the operator and a new inquiry begun by retyping the message. When the message is typed and visually verified, the operator depresses a Release key to signal the computer that the inquiry is complete. At this point, the inquiry station pauses until the reply is sent by the computer. When the computer branches to subroutine to develop a reply, the typewriter begins typing a reply. The reply is automatically typed at a rate of 10 characters per second.

Because an installation can consist of many Inquiry Stations, on occasion several stations may simultaneously request permission to make an inquiry. The system is designed to remember each request but accept only one request at a time. For example, assume that stations 1, 4, and 6 simultaneously request to make an inquiry. The computer accepts the inquiry from station 1 and the input circuitry remembers that stations 4 and 6 are waiting. When the reply is sent for the first inquiry, the computer signals station 4 to proceed. In other words, the input circuitry stacks the requests and processes them in sequence based upon the station number.

Figure 2:
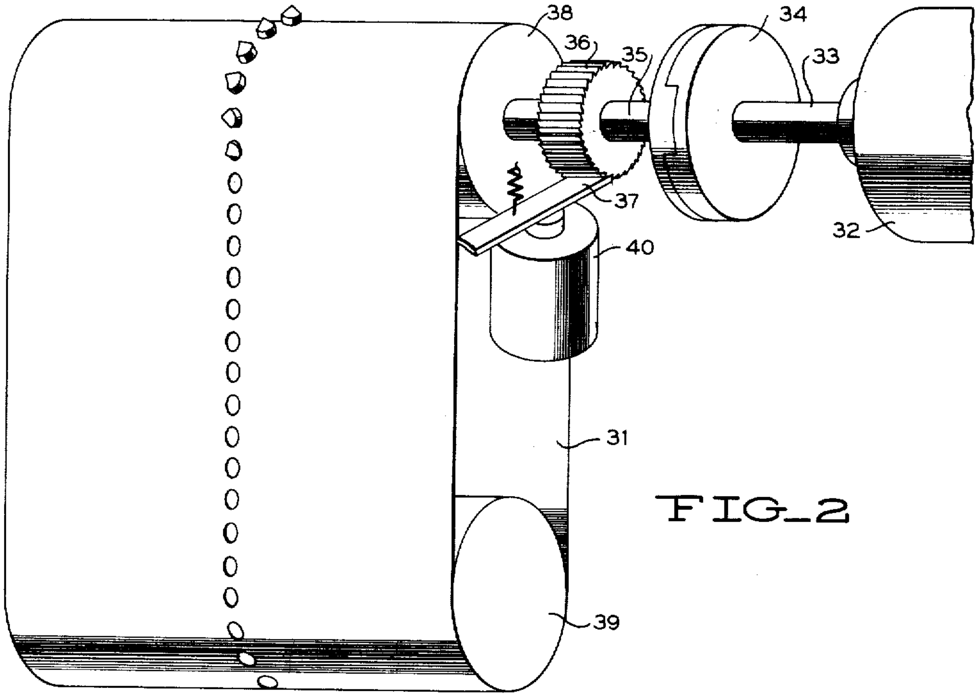
FIG. 2 shows the format tape control and motion producing means.

The program tape unit is mounted on the rear of the typewriter. The program tape is a 16 channel perforated plastic tape as shown in FIG. 2. Each of the 16 channels has an assigned significance. Holes are punched in the tape channels to control the assigned functions. The tape is advanced in conjunction with the programmed movements of the carriage or the control keys on the Inquiry Station.

Because the program tape can move in conjunction with the typewriter carriage movement, each column of the tape is punched to correspond to a given position on the line being typed. As the typewriter moves from character to character in a serial fashion, the program tape advances in like manner. On an inquiry routine, as each character is typed, the program tape designates the word and digit position of the input buffer where the typical character is to be transmitted. On a reply from the computer to an Inquiry Station, the program tape is again moving. The punching in the tape selects the word and digit position of the output buffer that is to be typed in that location on the paper.

In an application where an Inquiry Station serves as an input and as an output device, both programs are punched into one tape. The ends of the tape are then joined together to form a closed loop. This permits the Inquiry Station to proceed automatically from an input mode to an output mode and then be available for the next input mode inquiry.

The 16 channels of the program tape are assigned the following functions:

| Channels | Function |
|---|---|
| 1 to 5 | Word position of input or output word. |
| 6 to 10 | Digit position of input or output word. |
| 11 | Alphabetic character. |
| 12 | Control word (input) zero suppression (output). |
| 13 | Input format begins. |
| 14 | Output format begins. |
| 15 | Carriage return. |
| 16 | Tabulate. |
| 15 and 16 | Space. |

Channels 1–10 are punched to designate the computer word, and digit position within the word, which is to receive (on an inquiry) or transmit (on a reply) the character for the specific printing position being typed.

The code punched in channels 1–5 designate a specific word of the 10 input-output storage area words; channels 6–10 designate a specific digit position of the word. (Units, tens, hundreds position, etc.) Each of the channels is assigned a digit value of a 5 bit code. This 5 bit code is the same code that is used internally by the computer to record data in general storage.

Channels 1 to 5 specify the computer inquiry or reply words. The digit value for each channel is as follows:

| Channel: | Digit value |
|---|---|
| 1 | 0 |
| 2 | 1 |
| 3 | 2 |
| 4 | 3 |
| 5 | 6 |

| Word Designation | Channel Punching | Inquiry-Reply Words |
|---|---|---|
| 1 | 1, 2 | 1 |
| 2 | 1, 3 | 2 |
| 3 | 1, 4 | 3 |
| 4 | 2, 4 | 4 |
| 5 | 3, 4 | 5 |
| 6 | 1, 5 | 6 |
| 7 | 2, 5 | 7 |
| 8 | 3, 5 | 8 |
| 9 | 4, 5 | 9 |
| 0 | 2, 3 | 10 |

The foregoing table illustrates that word 2 is specified by punching channels 1 and 3; word 7 is specified by punching channels 2 and 5. Thus, each word is specified by punching two channels of the five bit code.

Channels 6 to 10 are punched to designate the position within a word of the computer inquiry output buffer on an inquiry or reply. Each channel is assigned a digit value so that the tape can be punched in the 2 out of 5 code combinations to represent digits 0 to 9.

| Program Tape Channel | Digit Value | Digit Position | Channel Punching |
|---|---|---|---|
| 6 | 0 | 1 | 6, 7 |
| 7 | 1 | 2 | 6, 8 |
| 8 | 2 | 3 | 6, 9 |
| 9 | 3 | 4 | 7, 9 |
| 10 | 6 | 5 | 8, 9 |
| | | 6 | 6, 10 |
| | | 7 | 7, 10 |
| | | 8 | 8, 10 |
| | | 9 | 9, 10 |
| | | 0 | 7, 8 |

On input format, channel 12 identifies this column as a position of the control word on an inquiry. The control word must be a numerical word and is automatically directed to word 10 of the input buffer. This means that channels 1–5 of the program tape are not needed to specify the computer drum input word. Therefore, channel 12 punching changes the function of channels 1–5 from "coded word" to that of a digit emitter for that tape column. Channels 1–5 are punched to designate the digit that is to be automatically transmitted to the computer. The channels 6–10 are punched to designate the position within the control word. The following example shows the coding for two positions of the control word.

| Channels | Punched | Description |
|---|---|---|
| 1–5 | Code 06 | Transmit a digit 6. |
| 6–10 | Code 02 | To the second digit position of word 10 in the input buffer. |
| 11 | Unpunched | Numerical character. |
| 12 | Punched | This column is designated as a position of the control word. |

In utilizing this format tape the fifth digit designates the typewriter to which the output information is to be returned.

Channel 13 is punched to indicate the start of the input format on the tape. It also is used to signal that the end of an output format has been reached. When a hole in channel 13 is reached, the Input signal light glows to indicate to the operator that the tape is in position for an inquiry message.

Channel 14 is punched to indicate the beginning of the output format. It prepares the Inquiry Station to accept a reply from the computer and turn on the Output light to signal the operator that the tape is in position for a reply. Channel 14 also signals the system that the end of the input format has been reached.

Figure 4:
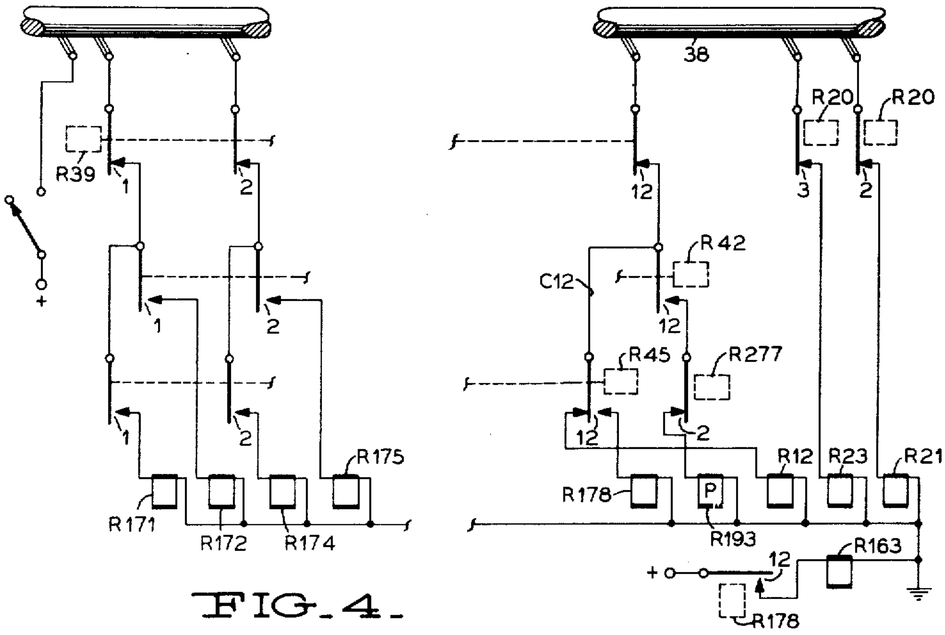
FIG. 4 illustrates the circuitry of the format tape hole sensing arrangement.

FIG. 2 shows a format tape 31 and the apparatus utilized in moving the tape which consists essentially in a constantly rotating motor 32 having a shaft 33 which connects to an overriding clutch 34 which in turn is connected to a shaft 35. A ratchet 36 and pawl 37 is used to control the movement of the tape 31. Ordinarily, the pawl 37 prevents the clutch from providing motion to rolls 38 and 39 and consequently the format tape 31. When the magnet 40 is pulsed, it is sufficient to allow one ratchet tooth of the ratchet gear 36 to pass the pawl 37 and consequently allow another row of holes in the format tape to be sensed. The sensing apparatus for the tape has not been shown in this view but is shown in FIG. 4.

The column designated "Punched" above refers to the digit values 0, 1, 2, 3, 6 referred to above so that code 02 refers to a digit 2, adding both 0 and 2, which is indicated by punches in channels 6 and 8.

Figure 3:
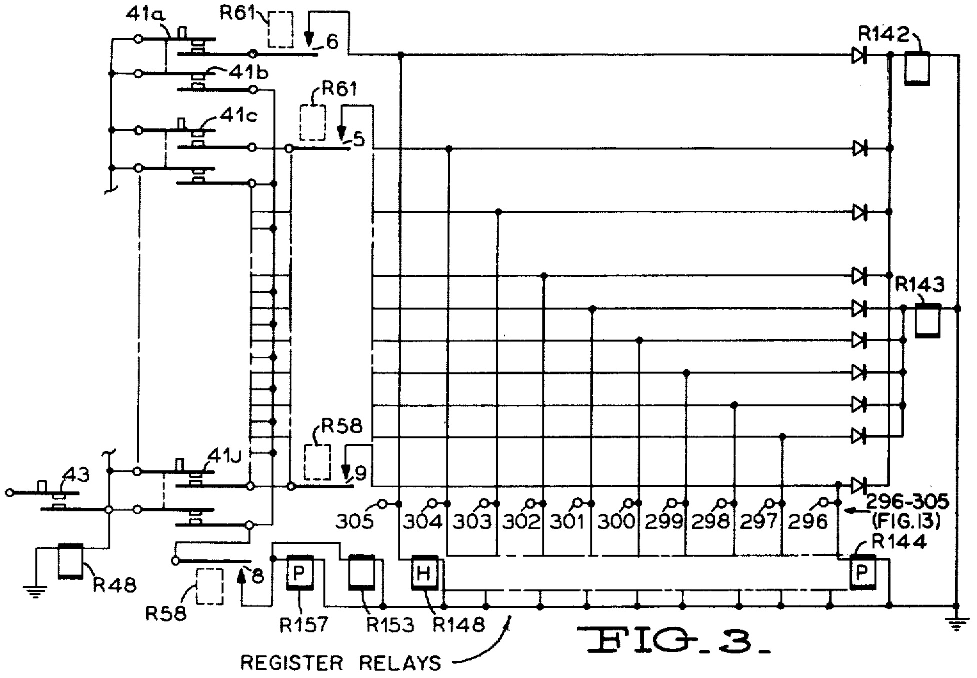
FIG. 3 illustrates the electric circuitry of the typewriter keyboard.

The keyboard of the typewriters 10 and 11 have a series of contacts 41 which are closed when the typewriter keys are depressed, FIG. 3. A contact 43 is closed at the same instant for each key to connect plus potential to each contact and operate the relay R48. Each key controls through contacts of relay R61 and R58, closed when typewriter is used as input, a series of relays R142 through 157, some of which have been shown. The connections 296–305 shown connected to the relays R144 to R148 are utilized in an operation to be described hereinafter.

Figures 5, 18:
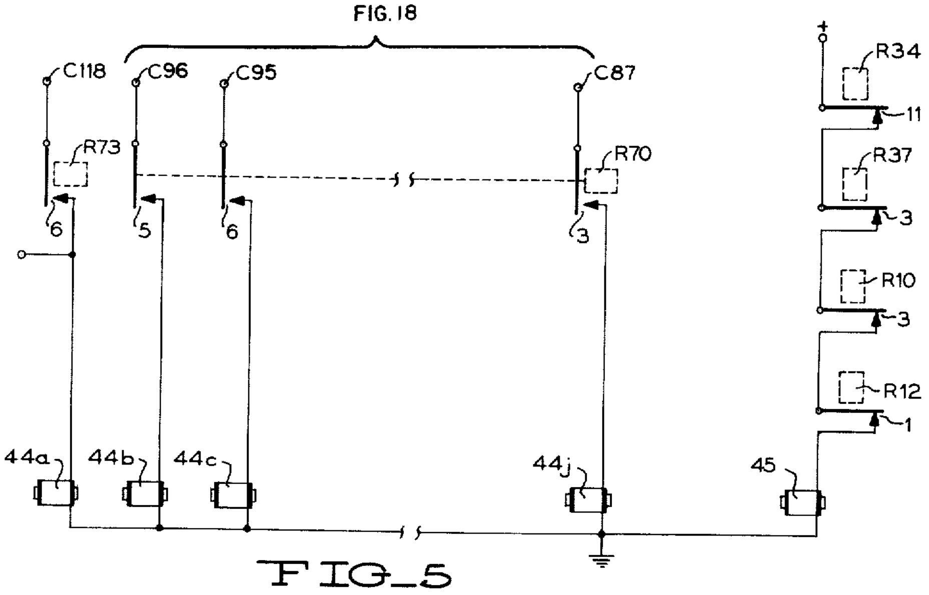
FIG. 5 illustrates the electromagnets utilized to depress the typewriter keys.
FIGS. 6–30 illustrate the input and output circuitry of the present invention.

The printing operation of the typewriter is controlled through a series of electromagnets 44*a–j* which, when energized through contacts of R73 and R70, FIG. 5, which are closed when the typewriter operates as a printer, by selection of a line C87, C89, C90, C118, etc., depresses the typewriter key selected to print the digit selected by the electromagnet. A keylock electromagnet 45, FIG. 5, is normally energized to unlock the keyboard for operation. If an error occurs in the operation of the system, the magnet is released by opening one of the normally closed points as shown to lock the keyboard from further operation.

*Detailed Description*

Figure 8:
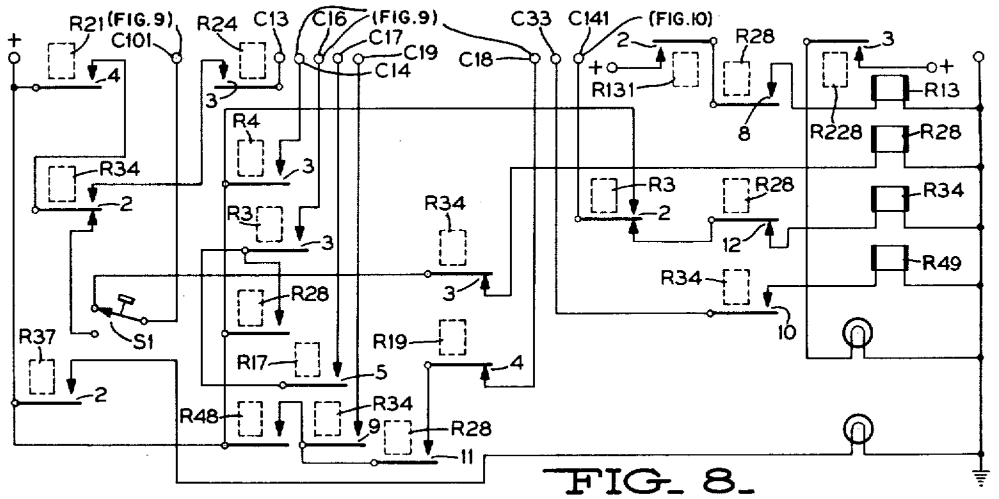
Figure 6:
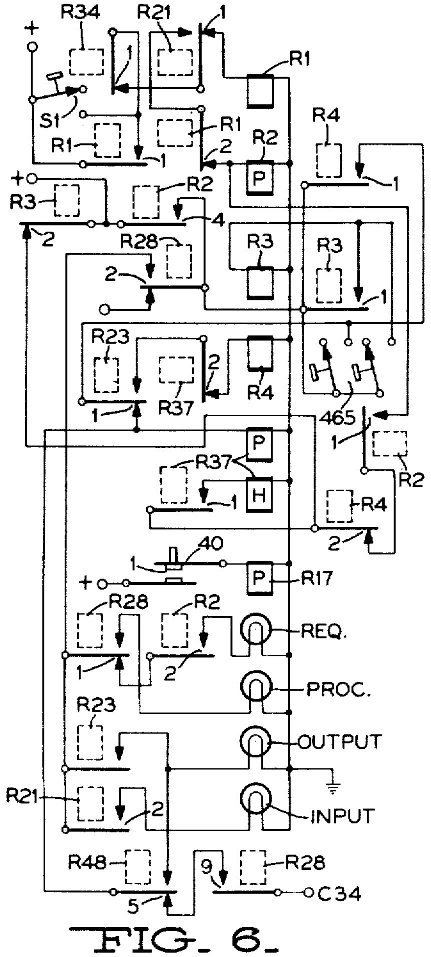

When an inquiry station operator desires to make an inquiry, a request key S1, FIGS. 6 and 8, is depressed and plus potential is furnished through relay contact R34–1 to a transfer contact R21–1 wherein if relay R21 in the format control, FIG. 4, has been operated, the circuit will be completed through relay contact R1–2 to pick the relay R2. A hold circuit is connected from +48 volts through the relay contact R3–2, which is the cancel relay, through the closed contact R4–2, which is the release contact, through the now closed contact R2–1 to relay R2. If the input format relay R21, FIG. 4, has not been transferred, the relay R1, FIG. 6, is picked which closes contact R1–3, FIG. 7, to make a circuit from plus voltage to and through relay contacts R34–2, R17–2, through now closed contact R18–1 to the tape escape magnet 40 and ground so that the tape magnet is energized until the escape magnet contact 40–1 is closed to energize relay R17 which opens the circuit to the escape magnet and allows the relay R18 to drop out. This is repeated until such time as R21 is energized.

Figures 9, 10:
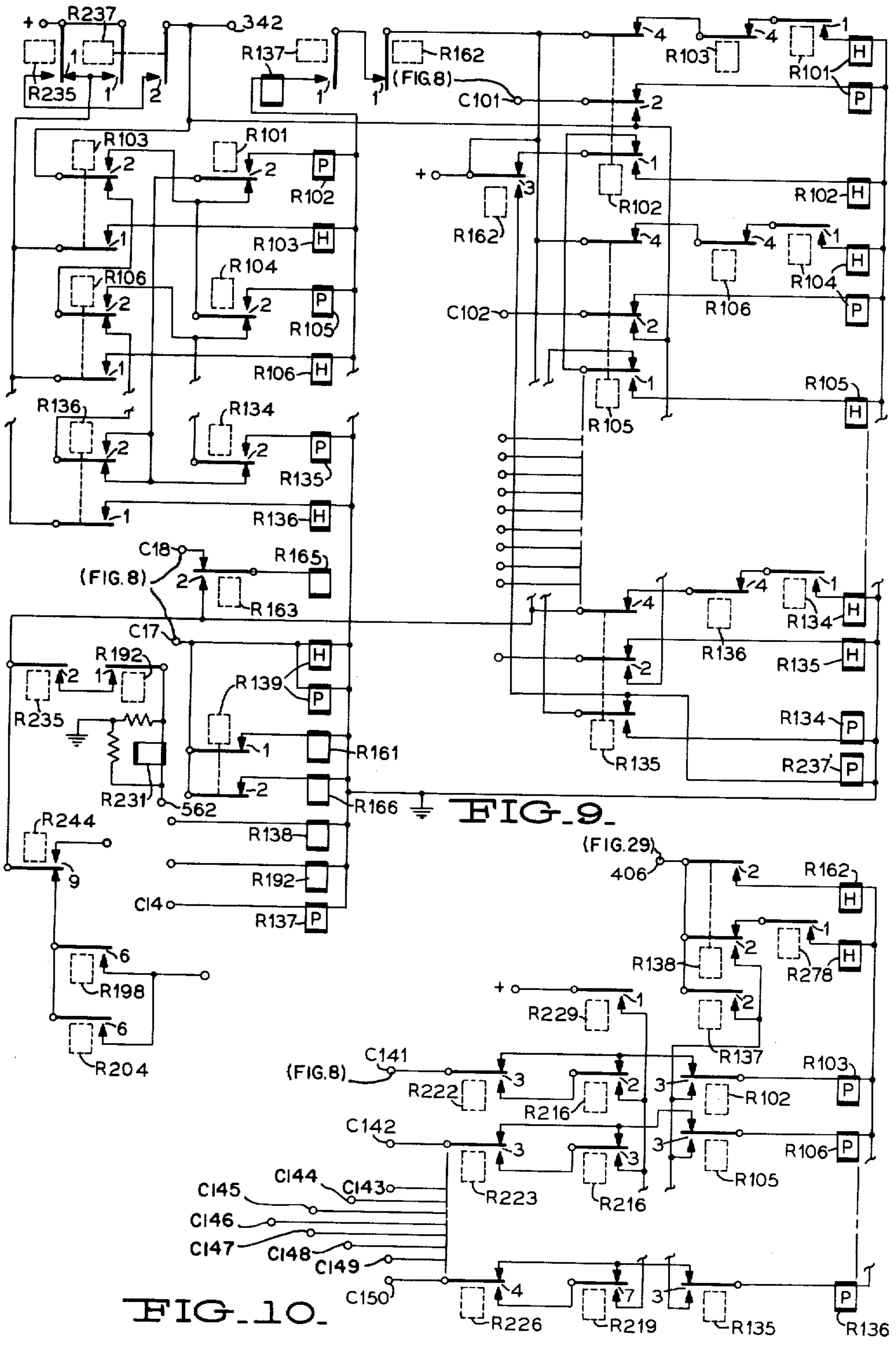

Referring to FIG. 8, the request key S1, when depressed, also closes a circuit through the now actuated contact R21–4 to plus voltage and the closed contact R34–2 to a line C101. The line C101, FIG. 9, is connected to the closed contact R102–2 to pick the relay R101 which indicates that typewriter number one has requested to be allowed to use the buffer. The relay R137 is normally connected through a series of points R102–1 through R135–1 through the closed contact R162–3 to +48 volts.

Figure 12:
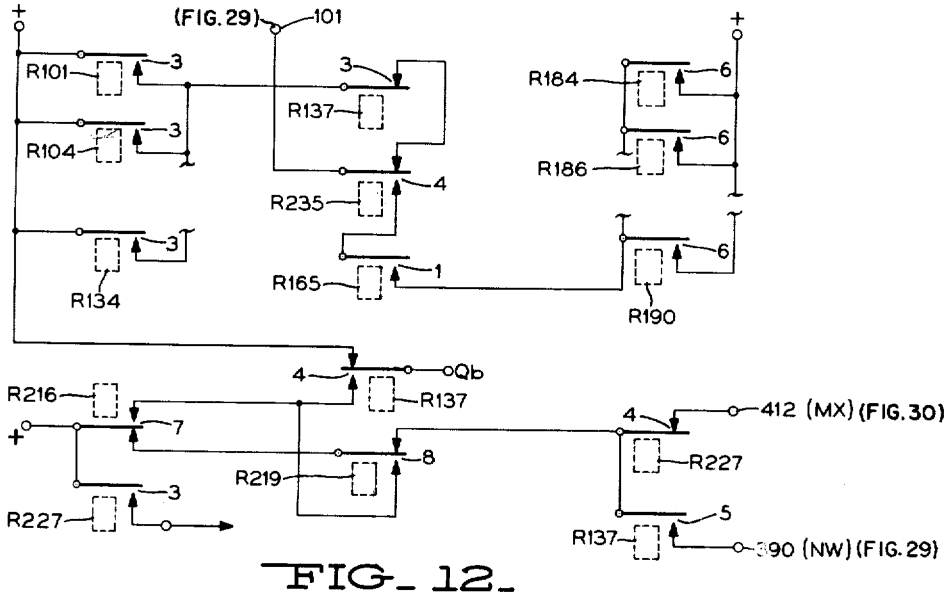
Figure 29:
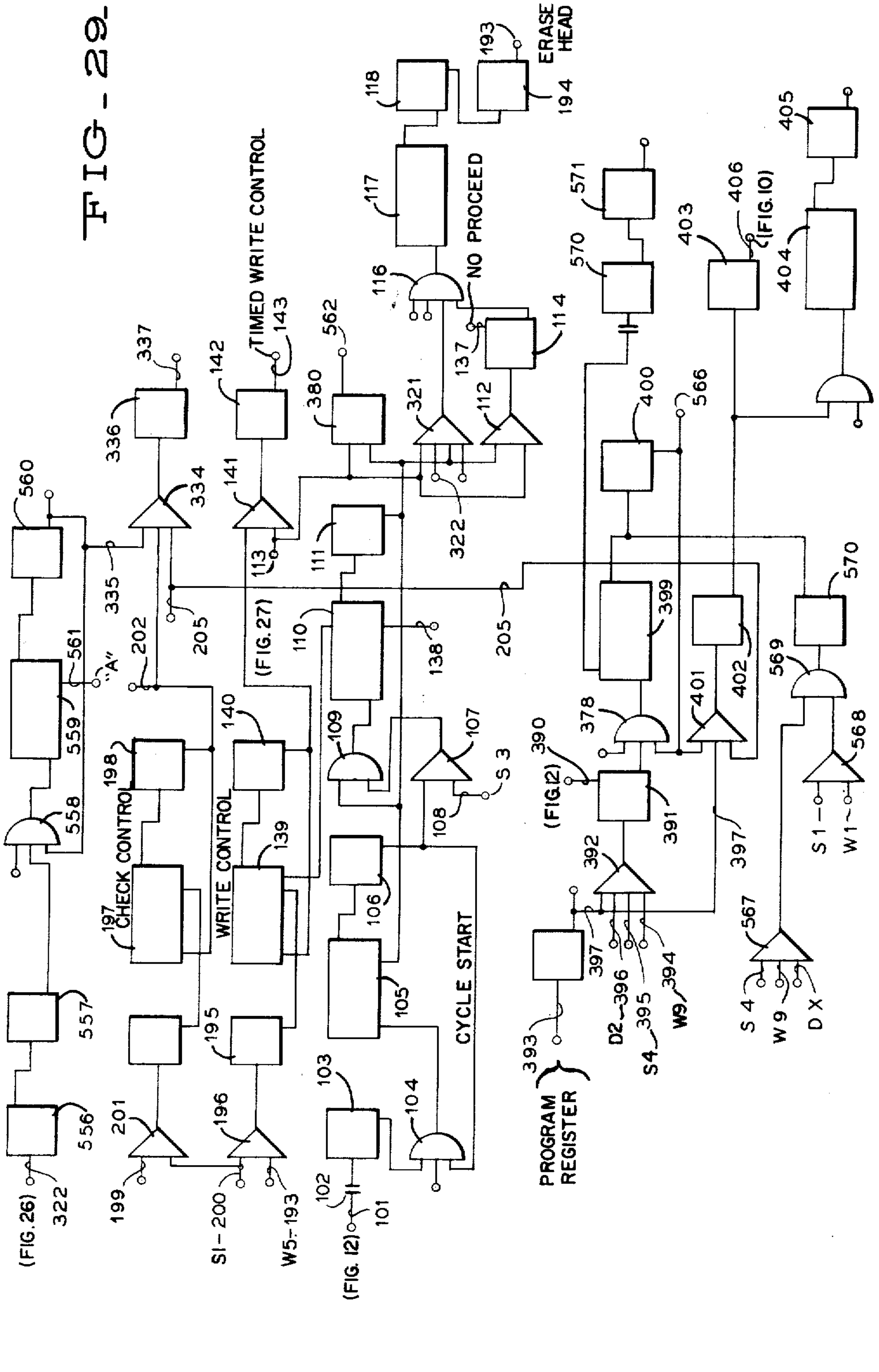

With the relay R101 operated, FIG. 9, the contact R101–3, FIG. 12, completes a circuit through R137–3, R235–4 to a line 101 which is shown completed in FIG. 29. With a plus pulse supplied to line 101 and differentiated across the capacitor 102 and reflected through the cathode follower 103, a positive signal will be generated and coupled to the OR circuit 104 which is part of a cycle start latch 104–106 and which turns the latch from Off to On and causes the output of the cathode follower 106 to rise and furnish a signal to the AND gate 107 as shown. With a sector 3 signal coupled to the AND gate 107 by line 108, a positive pulse will be generated and coupled through the OR circuit 109 and a double inverter 110 and cathode follower 111 which comprise an erase control latch which causes the output of the cathode follower 111 to rise and furnish a plus potential to the AND circuit 112 which, with a write timer signal over line 113, generates a plus signal which is applied to a cathode follower switch 114 along with a no proceed signal on line 137 to generate a signal through the OR gate 116, the inverter 117, and cathode followers 118 and 194 to the erase head of the computer line 193.

Figure 27:
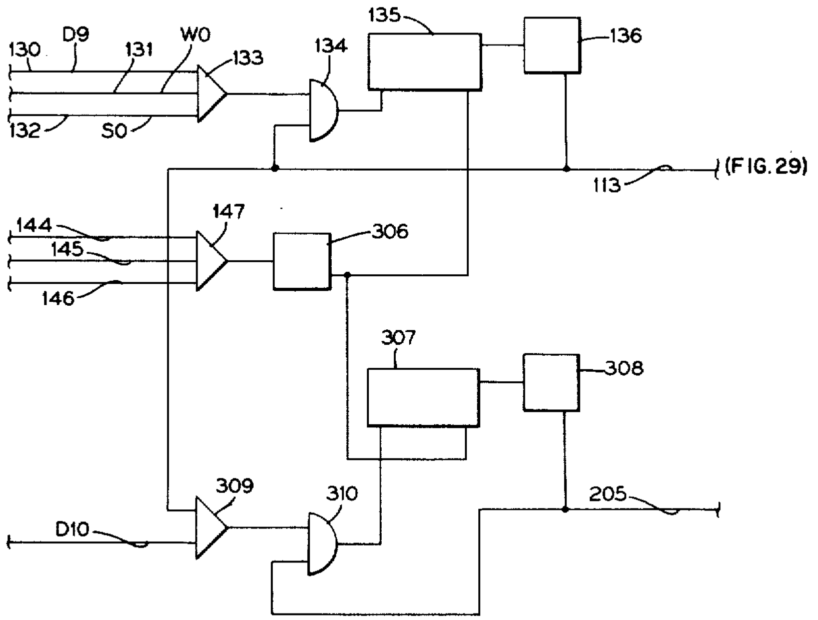

The write timer signal, line 113, controls the application, FIG. 27, to accurately define the complete buffer (10 words) area to be erased. Referring to FIG. 27, when the signal S0, which is sector 0, on line 132, coincides with the word 0 on line 131 and the ninth digit of line 130 in the AND gate 133 the write timer latch made up of OR gate 134, inverter 135, and cathode follower 136 are switched On to generate a signal as explained in connection with the previously mentioned circuitry. The signal on line 130 and 131 determines that there will be a signal two digits earlier than will be recorded on the general storage area when the information from the buffer storage is transferred. As it will be remembered, there is a two digit delay in transferring from buffer storage to general storage so that in general storage the position will be word 1, digit 0 when transferred.

Figure 19:
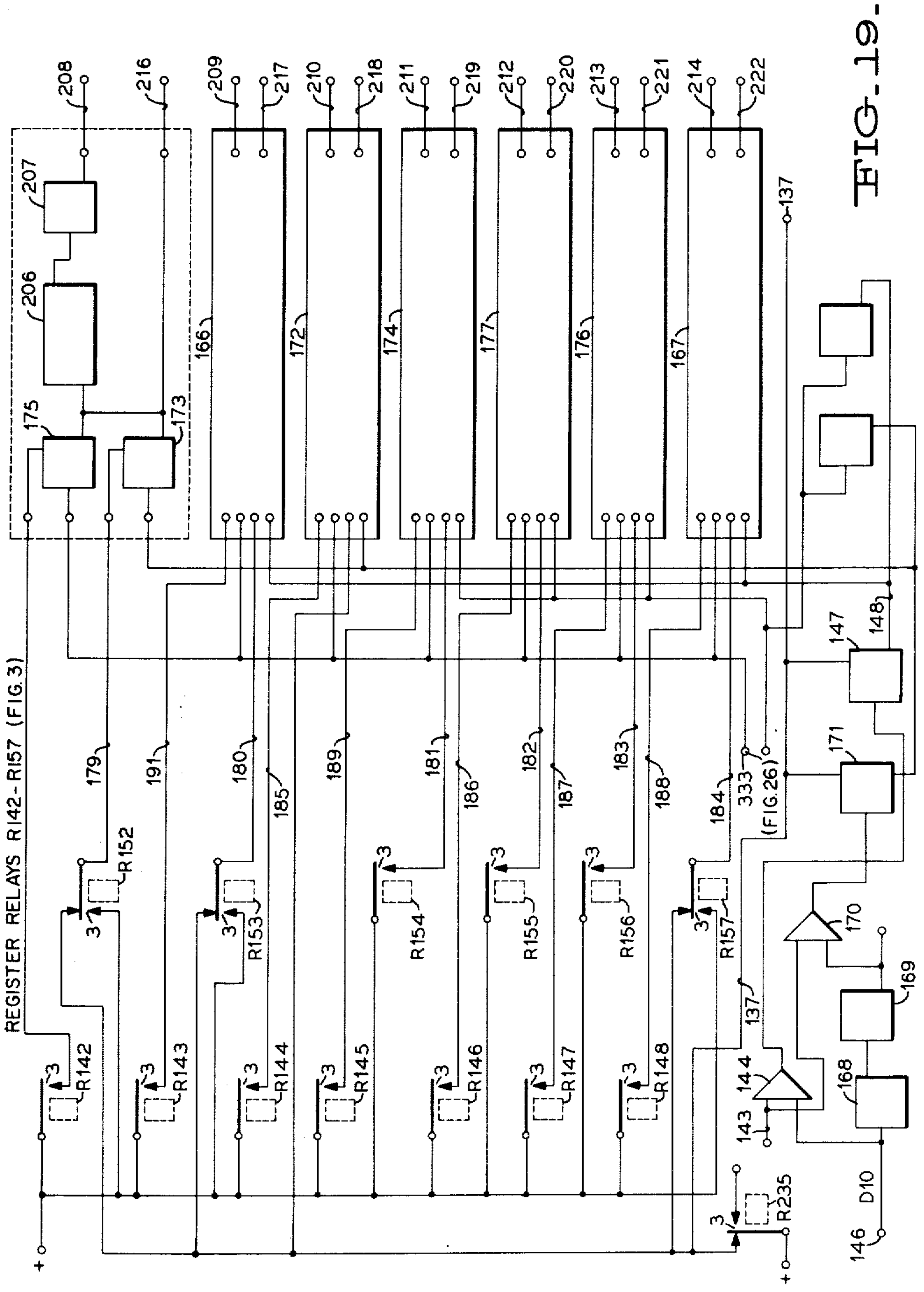

The no proceed signal which is connected to the switch 114 is obtained from the line 137 which is connected, FIG. 19, through a normally closed point R235–3 to plus voltage. The relay R235 is normally not picked but is operated on a signal from the computer to proceed, to be described hereinafter. On the following revolution of the drum, the sector 2 pulse, line 138, is connected to the reset terminal of the inverter 110, FIG. 29, which turns Off the erase control latch 109–111 which, since it is coupled back to the inverter 105, also turns off the cycle start latch 104–106. This allows the entire input drum buffer area to be completely erased for the processing of the input information.

As the inverter 110, FIG. 29, is switched Off, a signal from the plate of the second inverter is transmitted to a write control latch 139 and 140 to the inverter 139 which, through the cathode follower 140, locks up and applies a plus voltage to the AND gate 141. The AND gate 141 with the write timer control line 113, which is up as mentioned previously at given times, is connected through the cathode follower 142 and the output on line 143, timed write control, is raised to a high voltage level. The write timer latch 134–136, FIG. 27, is turned Off by a signal on lines 144, 145 and 146 to AND gate 147 which raises the output level.

In referring to the timing pulses from the magnetic drum, a change in terminology is necessary from that used in the general description in that the words of storage are listed as word zero, $W_0$ through word 9, $W_9$, instead of word one, $W_1$, through word ten, $W_{10}$.

The signals on lines 144, 145 and 146 consist of a "B" pulse, a $W_1$ pulse and a $S_1$ pulse. For each digit time period there are four timing pulses "A," "B," "C" and "D" which are available for switching. The output of AND gate 147 is connected to the reset terminal of the inverter 135 by a cathode follower 306. This allows an exact time period of nine words of information to be recorded in sector 0 and one word in sector 1.

Input 143, FIG. 19, of the timed write control, is connected to an AND gate 144 along a digit 10 pulse at 146. The output of 144, which is high when both inputs occur, raises the grid of the cathode follower switch 147 and the no proceed signal line 137 furnishes the plate voltage to furnish an output to a line 148 connected to circuits 166 and 167. The circuits 166 and 167 are the same as the circuit including cathode follower switch 175 and 173, double inverter 206 and cathode follower 207. When the digit pulse D10, line 146, is not present and the timed write control pulse, line 143, is present, the AND gate 170 furnishes a raised amplitude pulse to the cathode follower switch 171 which, with the no proceed signal, line 137, generates a signal to the cathode follower switches 172 and 173. With the write control latch, 139, 140, being turned On, FIG. 29, by the sector 2 pulse and being turned off by the coincidence of the S1 and word 5 pulse lines 193 and 200, the gate 171 or 147 will be On to enable either 172, 173 in all positions except digit 10 and 166 and 167 at digit position 10.

Figure 25:
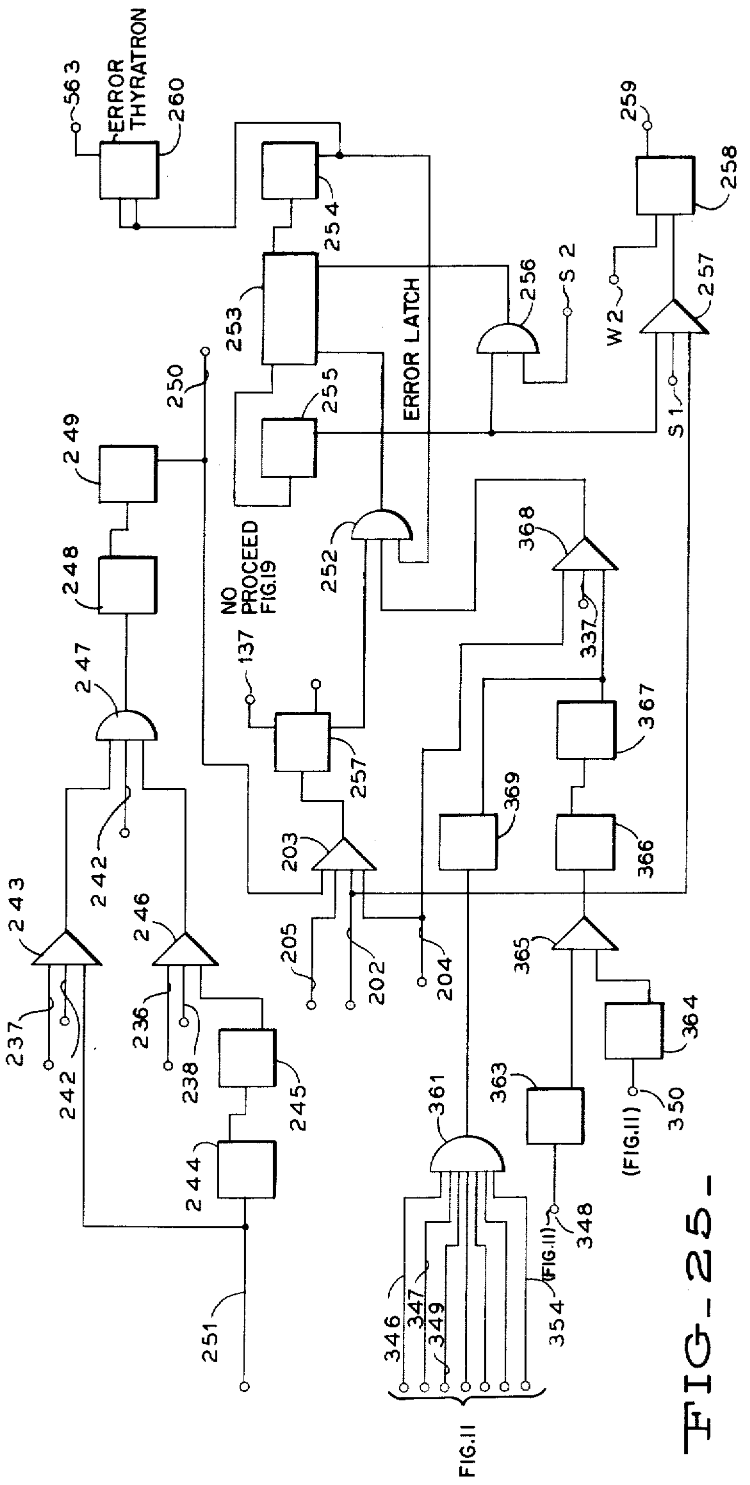

Referring to FIG. 19, it can be seen that plus potential is supplied to relay contact R235–3 and then to a series of lines 179 through 184 through relay contacts 152–3 to 157–3. As the system now stands, plus potential is applied to lines 179, 180 and 184 along with 137 which is the no proceed signal. It can be seen that: line 179 is connected to cathode follower switch 173; line 180 is connected to cathode follower switch 166; the no proceed line 137 is connected to cathode follower switch 172; and the 184 line is connected to cathode follower switch 167. In the coding used in this particular invention, a signal on line 180 and 184 represents a plus sign and would be recorded at digit 10 time while the signal from lines 137 and 180 represent zeros and would be recorded at all other digit positions. The write control latch is turned Off by the sector 1 pulse, line 200, word 5 pulse, line 193. As the latch 139, 140 goes Off, a pulse from inverter 139 to the check control latch made up of double inverter 197 and cathode follower 198 wherein the level of the cathode follower rises 198 and the line 202 goes up. See FIG. 25 for the extension of line 202 which is connected to the AND gate 203. A "D" line 204 along with a check timer line 205 and the output of a cathode follower 249 are connected to the AND gate so that the AND gate will furnish a positive pulse when all are positive.

Figure 24:
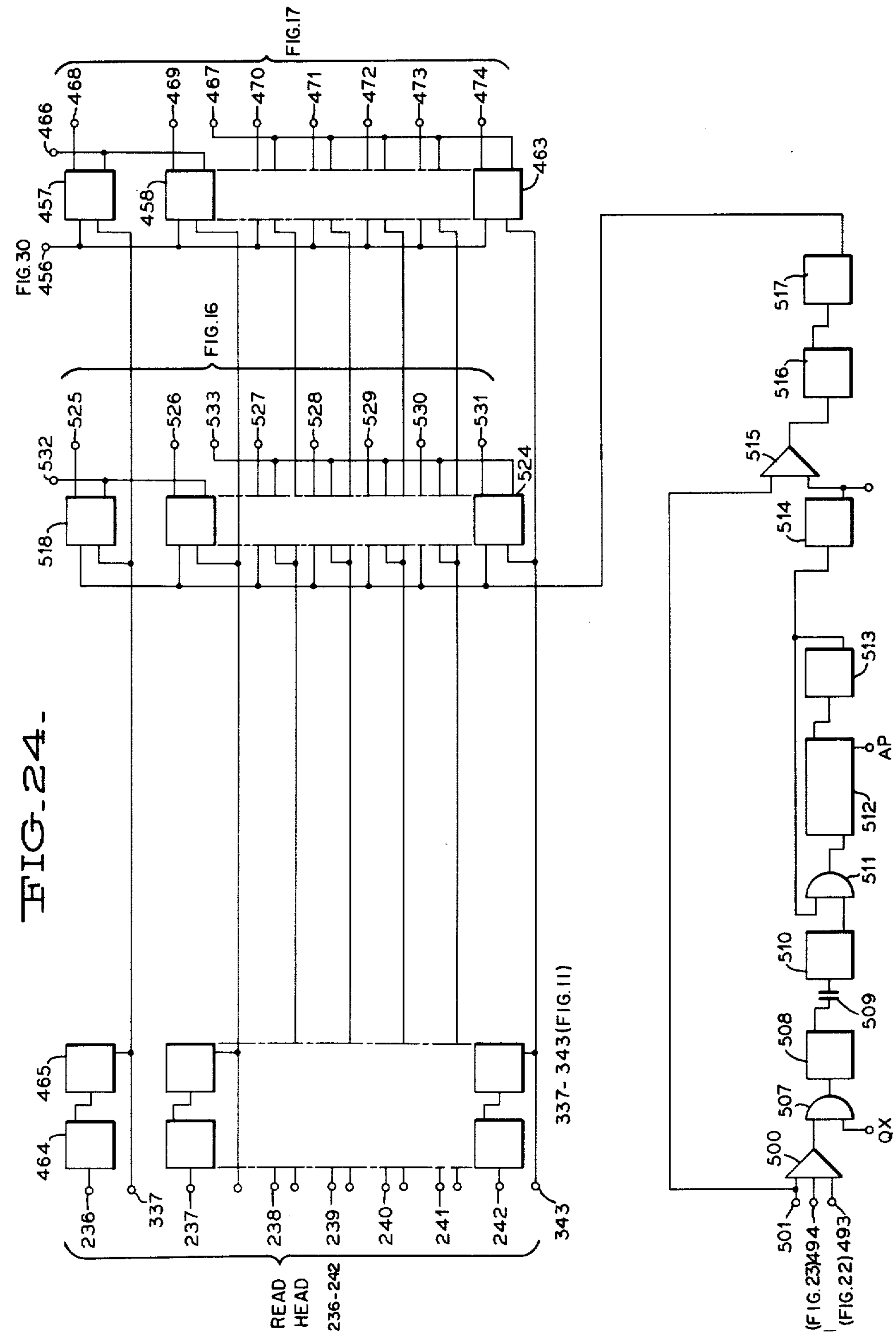

The readout lines from the computer are shown at FIG. 24 as a series of lines 236 to 242 representing, respectively, B0, B5 and Q0 through Q4. The B0 and B5 lines 236 and 237 and Q0 and Q4 lines 238 and 242 are conected such that B5 and Q4 are joined with the DX pulse line 251, FIG. 25, at an AND gate 243 while the 236 line and 238 line B0 and Q0 are joined at an AND gate 246 by an inverted DX signal on line 251 so that the inverter 244 gives us a condition of not DX so that DX may be sensed with AND gate 243 and sense all other digit positions with AND gate 246. By this method, we are able to determine that the output of AND gate 243 and 246 must always be high in order to drive the inverter 248 through the OR circuit 247 to a state of conduction to drop-plate the voltage. This gives a low voltage value on line 250 which being connected to AND gate 203 will prevent any raised voltage level output from this AND gate so that the output of cathode follower switch 251 will be low. A manual access error latch consisting of double inverter 253, cathode follower 254 and the OR circuit 252 will not operate so that the output of the cathode follower 254 will be low and an error thyratron 269 will not be fired.

With the manual access error latch off, a first inverter tube 253 will have a high voltage at its plate which connected to the cathode follower 255 will furnish a plus voltage to the AND circuit 257 which with the sector pulse S1 and the check control pulse on line 292 will raise the output of the AND circuit 257 to fire the thyratron 258 when the word 2 pulse appears on the second grid of the thyratron. When the thyratron 258 fires, the plate voltage on line 259 will be reduced to a low value. A line 259 is connected at the proceed relay 235 which completes a circuit through the relay point 237–4, FIG. 17, to plus voltage so that the proceed relay will be operated. It will be remembered that the relay R237, as shown in FIG. 9, is normally operated.

When relay 235 is operated, the contact point 235–1, FIG. 9, is transferred and supplies plus voltage through the contact 237–2 through the series of closed transfer points R103–2, R136–2 back to the relay 102 to operate this relay. When relay 102 picks the point R102–2, which connected the line C101 to the relay 101, is transferred and plus voltage is applied through R235–1, 102–2, to the typewriter through the request key S1, FIG. 8, now closed on its back contact, through contact R34–3, normally closed, to the relay R28 which is operated. With the relay R28 operated, plus voltage is applied to the closed contact R34–2, FIG. 7, through the input switch contact R28–3, through the operated relay contact R21–3 (input format) through the escape control contact R17–2, through the escape delay contact R18–1, to the tape advance escape magnet 40 which is energized to move the format tape. The circuit is broken as mentioned before by escape control magnet contact R17–2 to advance the tape one column. At the same time, the relay contacts R28–4, 5 and 6 close the circuit from plus voltage to ground for the relays R42, R58 and R61 which are the input relays for the next operation. When the relay R28 operates, the relay point R28–1 is closed to the proceed light 46 which is illuminated to inform the operator to proceed.

The system is now in condition to accept the control word entry which may be type. The format tape is so arranged to place the control digits in the word 0 of sector 1, which would be word 10 as used in describing the number of words to be entered, since word 1 is in sector 0, but, in the usual case, to prevent tampering with the operation to be formed in the computer, the control word is prepunched in the tape and the operator has no control over this phase of the operation.

Figure 13:
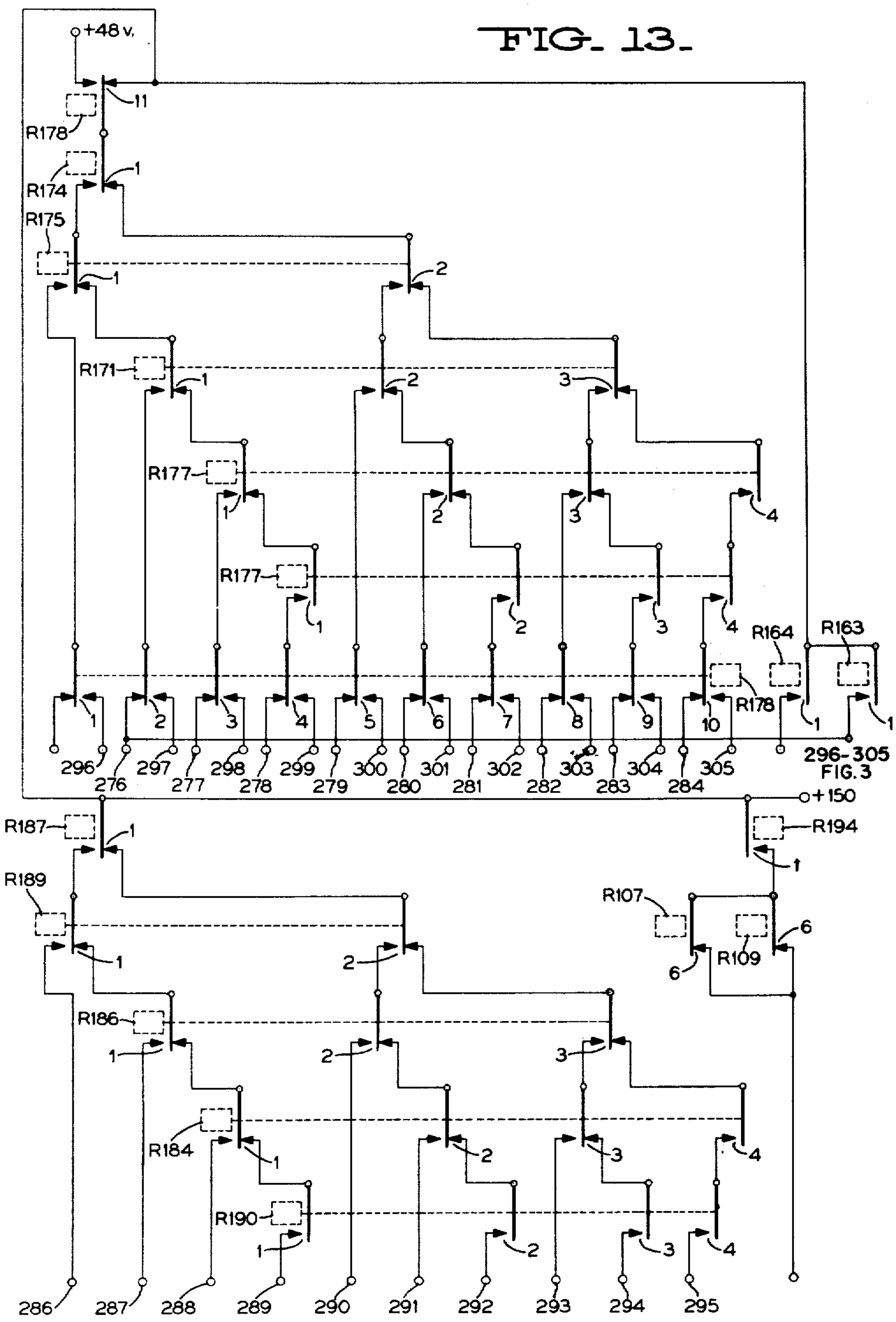
Figure 14:
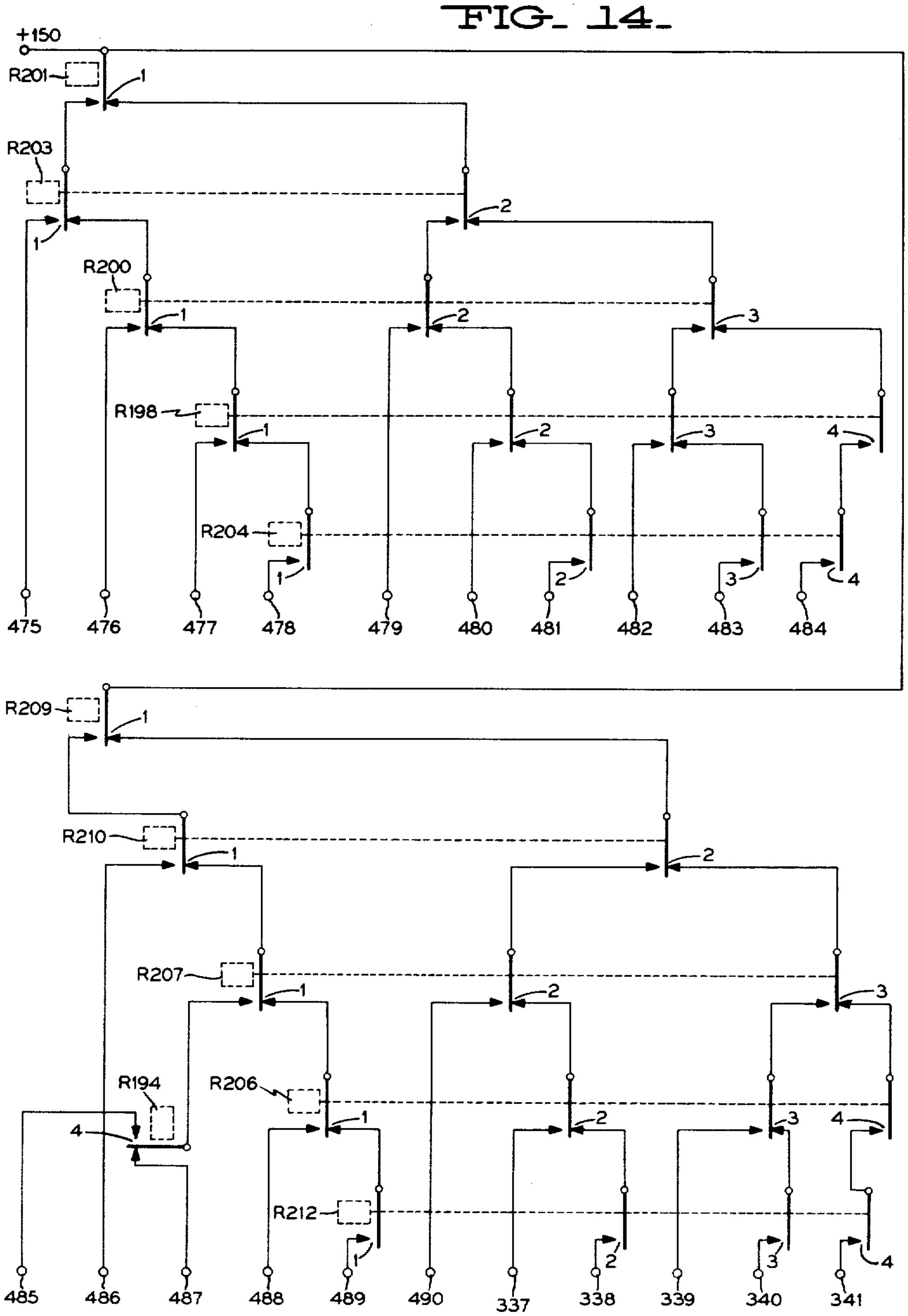

With relay R42 operated, a circuit will be closed, FIG. 4, to the line C12 and to the relay R12 which is the control word relay from contact roll 38 through format tape 31. With plus potential applied over lines C12, the relay R178 is picked and closes its contacts R178–12 to the relay R163. With the relay R163 operated, a contact point R163–1, FIG. 13, is operated to apply plus potential to the line 276 which signifies that the word to be entered is the 0 word. As will be remembered, the format relays in the presence of the control word designation act both as the digit information through relays 178, 177, 171, 172, 175 and 174 while the relays 187, 189, 186, 184 and 190 act in the same manner as usual to determine the digit position in which the control word digits are to be placed. With the relay R178 operated, the points 1–10 were transferred to connect a series of lines 296–305 to the input relays 144, 146, 147, 148 and 145, FIG. 3. When these relays operate, they close point 3, FIG. 19, to furnish plus potential to a series of lines 185 through 189. With the digit format relays operated, plus potential is applied to a variety of lines 286–295 in accordance with the operation of the relays shown, FIG. 13.

When the format relays operated, they closed through a series of contacts R184–6, R186–6, etc., FIG. 12, a circuit through the point R165–1, closed when the delayed control word contact point 163–2 was closed, FIG. 9, the relay point 235–4 which is the proceed relay is also closed and plus potential is applied to a line 101 as previously set forth.

The line 101, FIG. 29, is connected to the cathode follower 103 and operates in the same manner as described previously to turn on the cycle start latch and the erase control latch so that the output of the cathode follower 111 rises to furnish a plus voltage to the AND gate 321 which has connections from the write timer line 113 and the character check on line 322. When these lines coincide at a raised voltage, the output of AND gate 321 rises and is connected through the OR circuit 116, double inverter 117 and the cathode followers 118 and 194 to erase the zeros specified in the digit of the control word as determined by the format tape.

The format tape has perforations in row 12 for each digit of the control word as mentioned previously.

Figure 20:
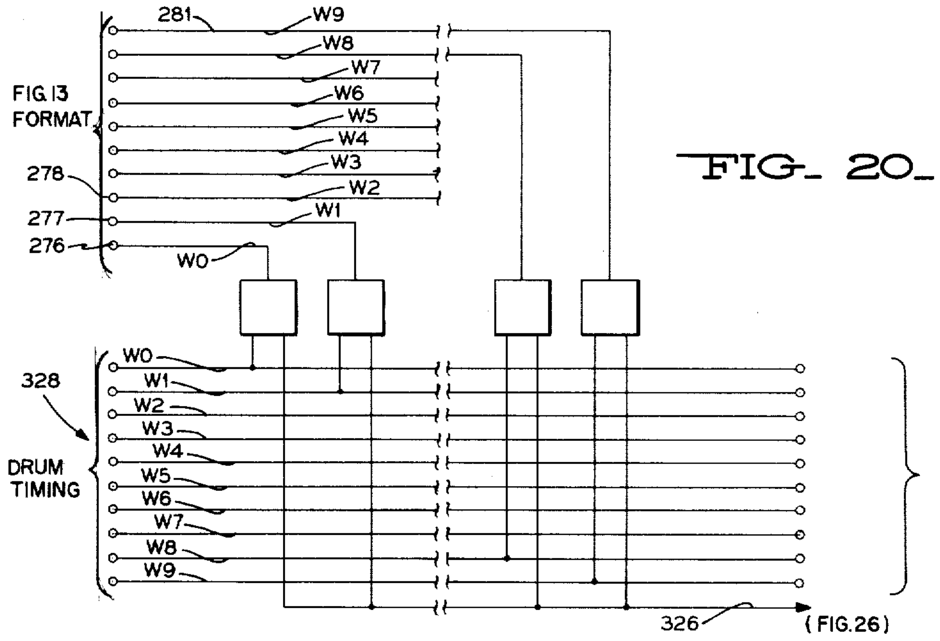
Figure 21:
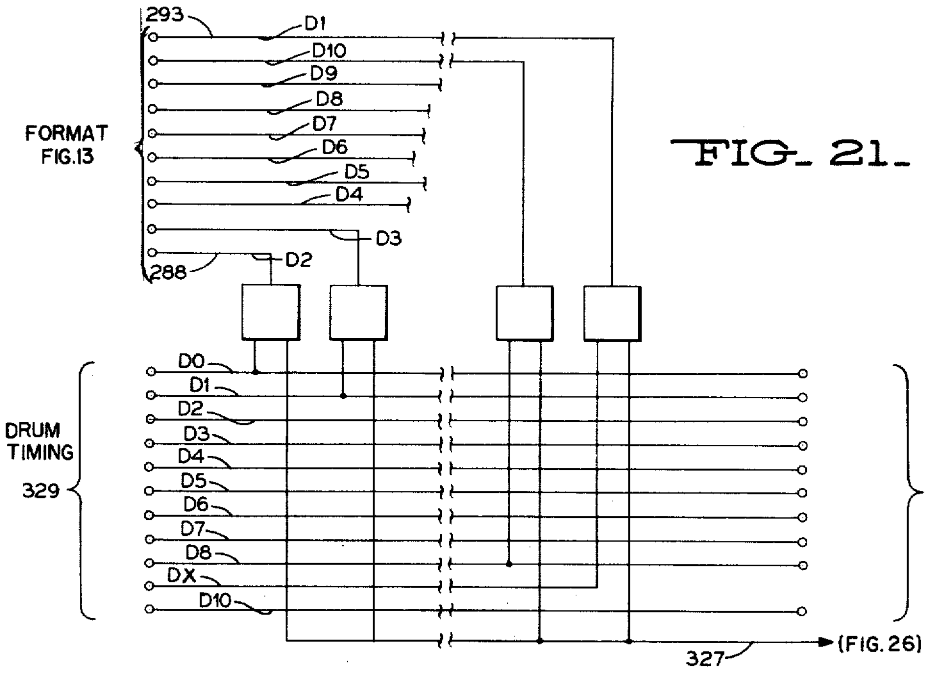

The circuits shown in FIGS. 20 and 21 are used to time the entry of information onto the rotating magnetic drum in accordance with the timing of the drum. The output from the matrices, FIG. 3, is applied to the upper set of lines in each figure and consequently to the cathode follower switches. The drum timing 328 and 329 determines when the switches will conduct to apply an output pulse to the word line 326 and digit line 327.

Figure 26:
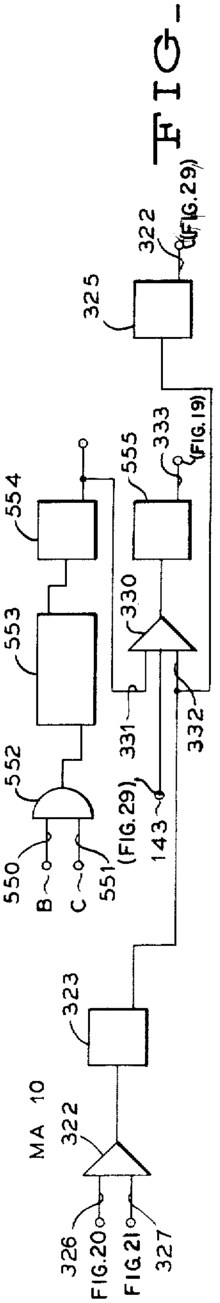

The lines 326 and 327 are applied, FIG. 26, to an AND gate 322 which when both lines are high as a raised output which is reflected through cathode follower 323, to AND gate 330 and to a cathode follower 325 which is connected to the line 322, FIG. 29.

During the erase cycle thereof, the zeros formally stored are erased when the word and digit pulse coincide.

As explained previously, when the erase control latch 109–111 is switched Off by the S2 pulse on line 138, the write control latch 139 and 140 is turned On and stays On until the sector 1 pulse, line 200, and the word 5 pulse, line 193, coincide at the AND gate 196. In FIG. 26, the time write control signal, line 143, EC pulses through OR circuit 552, inverter 553 and cathode follower 554 to line 331 and the output of the cathode follower 323 for the input word and digit on line 332 appear at AND circuit 330 and subsequently cathode follower 555 which transmits the write digit to line 333, FIG. 19, to pulse the cathode follower switches 165, 173, 168, 166, 172, 174, 175, 176, 177 so that the information present at the output of the relay matrix will be recorded at the proper digit position.

When the write control latch 139, 140, FIG. 29, is turned off by coincidence of a sector 1 pulse and a word 5 pulse to the AND gate 196, the write control latch going off turns the latch comprised of inverter 197 and cathode follower 198 On. The check timer line 205, the check control latch 202 line and the line 335 apply their output to AND gate 334 that the information recorded is to be checked against that then present in the relays.

The character check line 322, see FIG. 26 also, is applied to an inverter 556, cathode follower 557 to a latch 558–560 which is set by the coincidence of the word and digit line 326 and 327 as explained previously and reset by an "A" pulse at line 561. Since one digit is lost in recording on the input buffer, it is necessary that delay be provided of one digit when checking in order to obtain the location then recorded. The latch provides the necessary delay.

Figure 11:
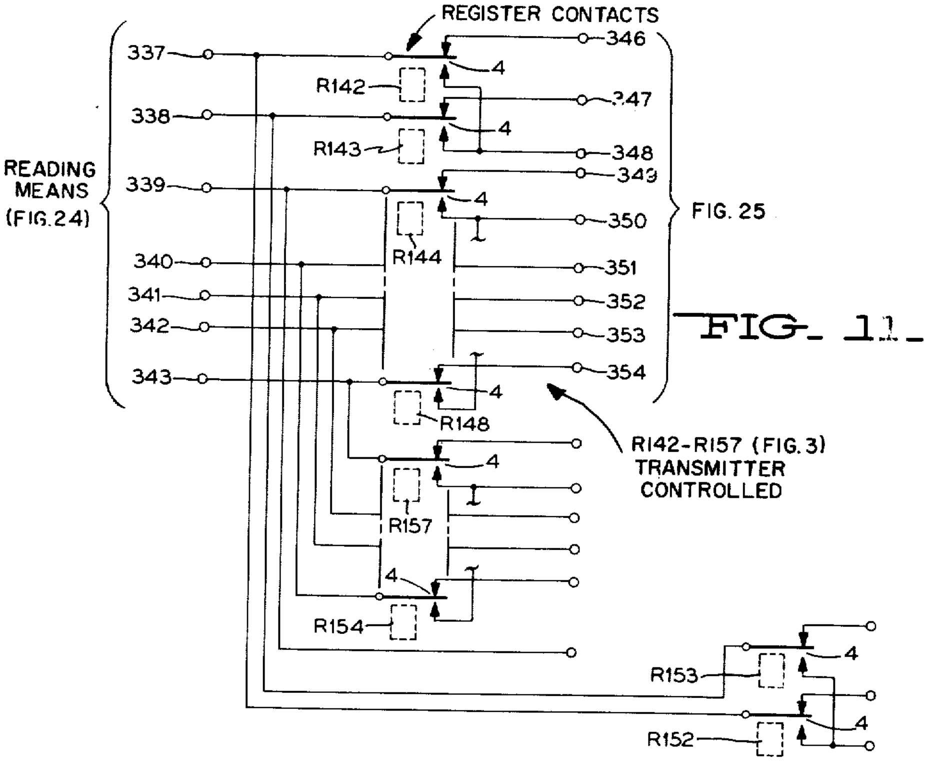

Referring to FIG. 11, it is seen that the output from the input buffer comprises a series of lines 337–345 which transmit the information as it passes by the sensing heads. A series of relay transfer points 142–4 through 157–4 are connected to these lines. The normally closed points of the contacts are connected to the OR circuit 361, FIG. 25, and the normally open points are connected in parallel in two groups of lines 348 and 350 which terminate in cathode followers 363 and 364. Since the actuated relays should connect the pulses from the input buffer to the lines which are normally not connected thereto, it is possible to determine by detecting the presence of any input from the input to the OR circuits 361 as a mistake and also detecting from each cathode follower circuit that there is at least one of the binary and one of the quinary bits present by providing an AND gate 365 which furnishes an output through an inverter and cathode follower 366 and 367 to keep the input to the AND gate 368 down when there are at least one binary and one quinary bit but no output from OR gate 361 and cathode follower 369 so that the input to AND gate 368 will not be raised. If the output is raised, the error latch 253, 254 will be turned On and fire thyratron 260 to indicate an error.

When the erase control latch 109–111, FIG. 29, was turned On, the thyratron 380 was fired when line 113 went up and the line 562 went down, now see FIG. 10, which resulted in relay R231 being picked. When relay R231 closes contact 131–2, FIG. 8, a circuit was completed to the relay R13 which closed a circuit, contact 13–1, to pulse the tape escape magnet and move the format tape one column. The remaining words and digits therein are entered in a like manner except that the use of the format relays for controlling the digit relays is not used in this case and character information is received from transmitting contacts.

Figure 7:
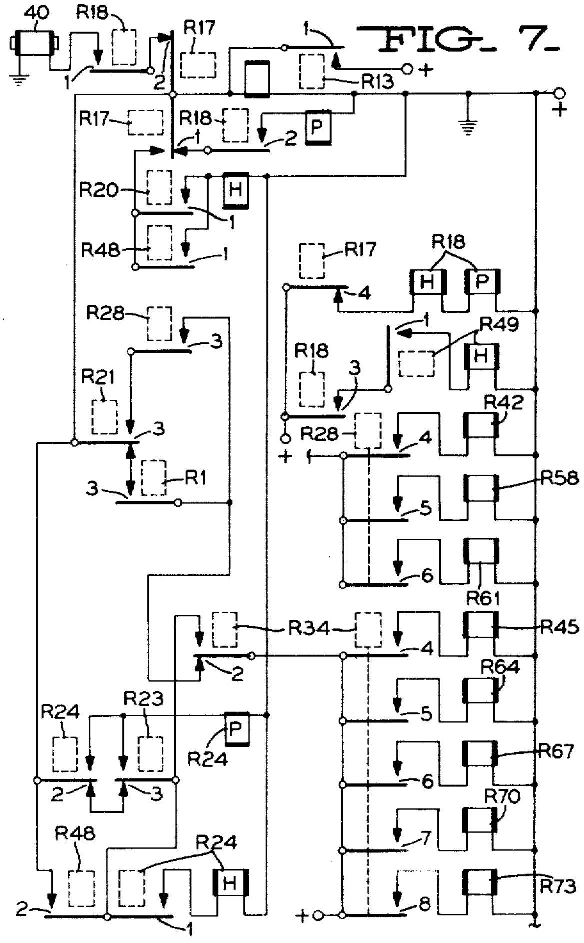

When the complete input data has been transmitted to the computer, the output format relay R23, FIG. 4, will be actuated to close the contact R23–3 and the contact R23–1, FIG. 7, to complete a circuit to the release switch 463 and release relay 4 so that the operator, when depressing the release key, operates relay 4 to close a contact R4–3, FIG. 8, to complete a circuit to the line C14 to pick the relay 137, FIG. 9. When relay R137 operates, the point R137–5 closes to connect plus potential through 216–7 and 219–8 to the line 390, FIG. 29, which is connected to a cathode follower switch 391 which is operated when the line 394, 395, 396 and 397 are up. Line 394 represents word 9 time, line 395 represents sector 4 time, 396 represents digit 2 time. The line 393 is a control pulse from the computer from the program register not herein disclosed in detail which operates when the particular code on which the system is set up arises to actuate the cathode follower 391 through the OR circuit 378 to the inverter 399 and cathode follower 400 which make up the latch circuit. This signal 566 is a signal to control the buffer storage to general storage transfer procedure and is used in the computer. At the same time, the line 397 being up with the buffer storage being up and the check timer line 205 being up the cathode follower 402 will transmit a pulse to the thyratron 403 and to the inverter 404 and cathode follower 405. This signal from the cathode follower 405 is used in the computer to transfer from input buffer to general storage. When the latch circuit 378, 399, 400 is reset, the computer is released to process the information. The output of thyratron 403, line 406 operates a relay R162 the contact hold points for the relays which have been picked for the requesting of the typewriter in the first instance.

Figure 30:
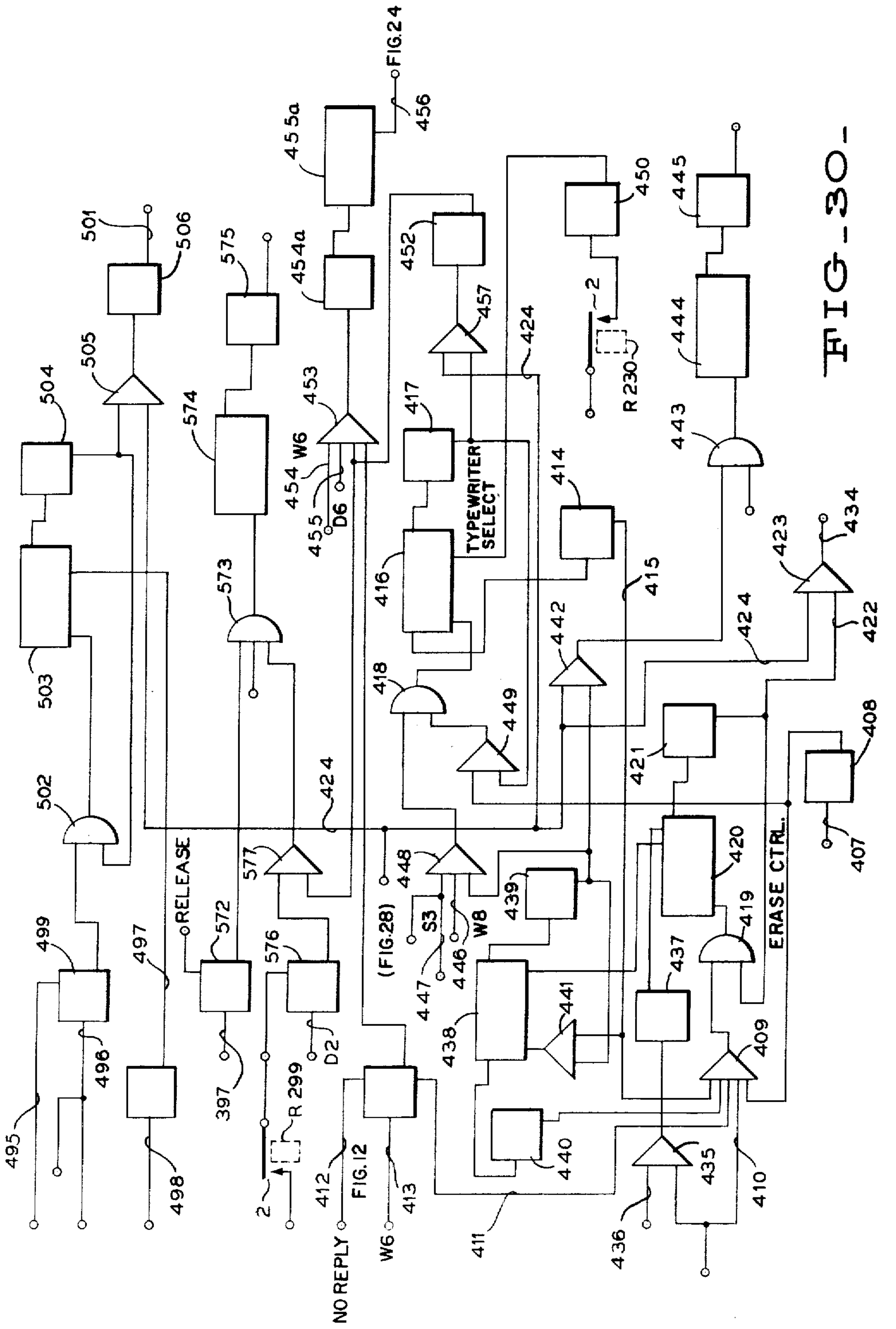

When the data transmitted to the computer has been processed in the general storage area, a code is transmitted and a pulse generated in response thereto on line 407, FIG. 30, which is coupled through the cathode follower 408 to the AND gate 409. Also connected to the AND gate 409 is a line 410 on which the sector 2 pulse is generated. On line 411 which is taken from the output of the cathode follower 567 the output is up for a coincidence of the word 6 line 413 and the no reply line 412. The no reply line, FIG. 12, is connected between plus voltage relay contact R216–7, R219–8, R227–4 to the line 412. The contacts between plus voltage and the line 412 are utilized to prevent overlap between input and output.

Figure 28:
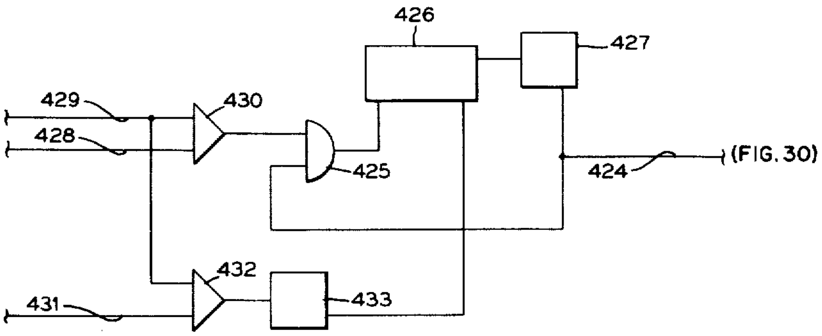

The typewriter select latch made up of OR circuit 418a, FIG. 30, double inverter 416 and cathode follower 417 furnishes an output from the first inverter to the cathode follower 414 so that the output is high at the AND gate 409 which will have a high voltage level and cause the latch circuit made up of OR gate 419, inverter 420 and cathode follower 421 to be turned on and raise the voltage level of the line 422. The erase control latch 419–421 was turned on at sector 2, word 6 which would be word 26 in counting from the beginning of S0. A further line to AND gate 423, which is line 424, is connected to the timer, FIG. 28, which shows a latch circuit 425, 426, 427 which is set to an on position by coincidence of the sector 2 pulse on line 428 and the word 7 pulse on line 429 coinciding at gate 40 and being turned off by coincidence of the sector 3 pulse on line 431 with the word 7 pulse on 429 to gate 432 through cathode follower 433 so that the timer is on from words 27 to 37 to provide an exact erasure of the output buffer zone for words 27 through 36. The erase control gate is turned off at the following revolution of the drum by a pulse at line 410, sector pulse, and line 436 which is the word 5 pulse coincidence at the AND gate 435 coupled through the cathode follower 437.

When the erase control latch 419–421 is turned off, a signal from the double inverter 420 is coupled to the inverter 438 of latch 438, 439, 441 to turn this latch On and raise the output of the cathode follower 439 which is connected back through the AND gate 441 which in coincidence with the output of cathode follower 414 keeps the latch circuit in its On condition. With the latch cathode follower 439 in a raised position, the AND circuit 442 in coincidence with the timer line 424 has a raised output which is connected through the OR circuit 443, the inverter 444, and cathode follower 445 to the computing apparatus as the signal to transfer from general storage to the position which has previously been erased, that is, word 27 through 36.

With the output of the cathode follower 439 raised, and a raised line 446 and 447 which represent word 8 and sector 3 pulses respectively, the output of the AND gate 448 will be raised and coupled through the OR circuit 418 to turn on the typewriter select latch 416, 417, 418, 449 which will operate through the cathode follower 417 and AND gate 418 which furnishes a raised output in conjunction with the output of 408 which has the reply code from the computer still maintained thereon to lock up the latch through OR circuit 418. When the inverter 416, in its first stage, goes down, the cathode follower 414 will have a lowered output potential which will take plus potential off AND circuit 441 and trip the latch 438, 439, 441 through inverter 438. The typewriter select latch is tripped when the contact R230–2 closes a circuit from plus 150 volts to the input of cathode follower 450 which is connected to the double inverter and turns the latch off.

At the present time, the typewriter select latch being on, the output of cathode follower 417 is up and connected to the AND gate 451 which when the timer signal on line 424 is raised at word 27 an output is generated through cathode follower 452 to AND gate 453. Two additional lines 454 and 455 on which the word 6 pulse and the digit 6 pulse are present allow the AND gate 453 to rise in voltage level as the next word 6 comes up in the drum revolution which would be word 36 at digit 6 time. It should be remarked at this time that the timing between general storage to buffer storage leaves the buffer storage area one digit later than it was in general storage so that when gating from general storage is necessary that a digit 6 time be used in order to sense the information contained in digit 5. In this respect, it will be remembered that stored in digit 5 is the number of the typewriter to which the information from the output buffer zone is to be sent. In the usual case, this in punched in the tape in the control word which is the tenth word or 0 word of the data stored in the drum. In processing, the digit remains the same and is merely used to select the typewriter which is to be used to type the information. The output of AND gate 453 is connected through an inverter 454 and an inverter cathode follower combination 455 so that the output of the inverter cathode follower 456 is a plus voltage as was contained in the output of the AND circuit 453.

Figure 17:
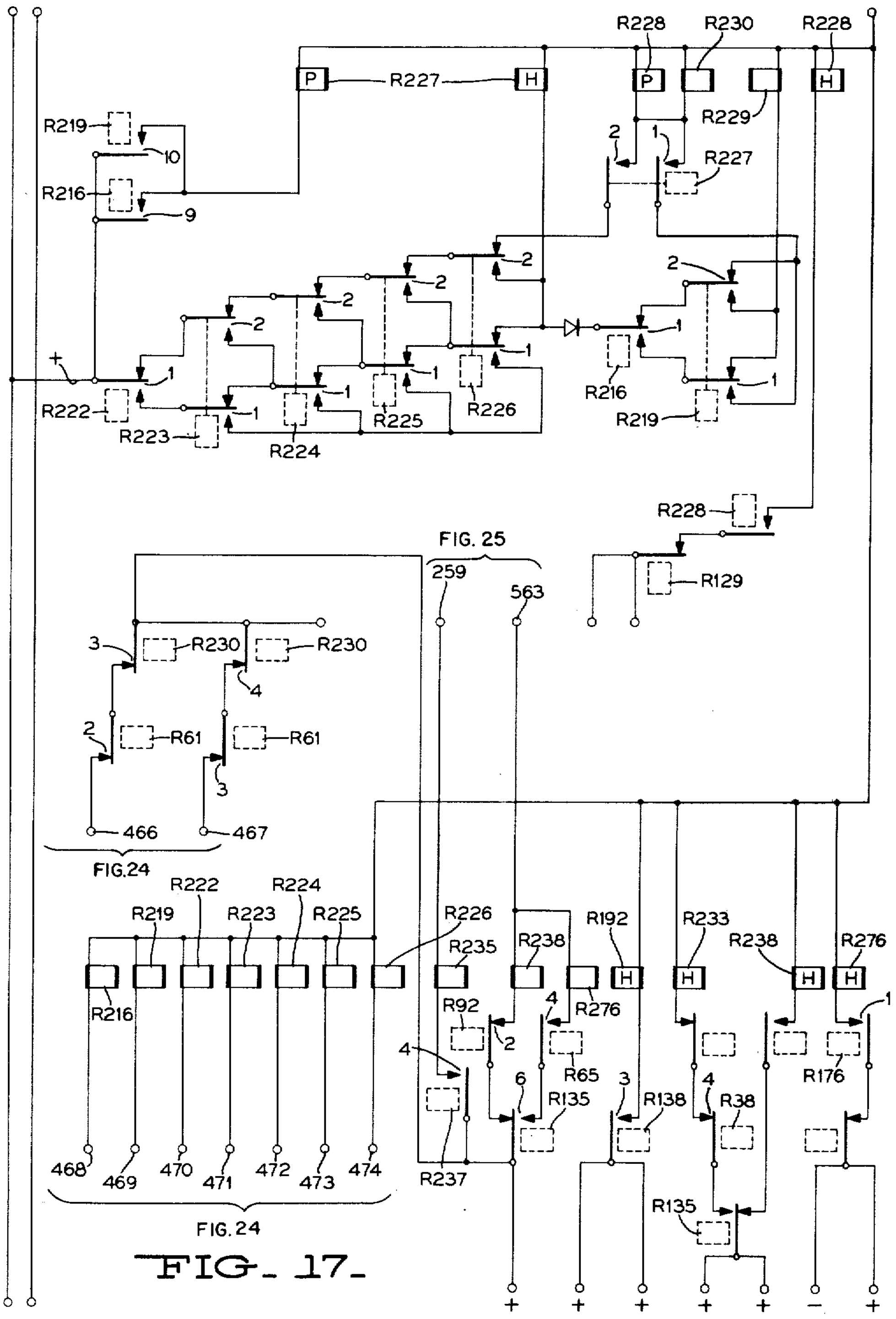
Figure 18:
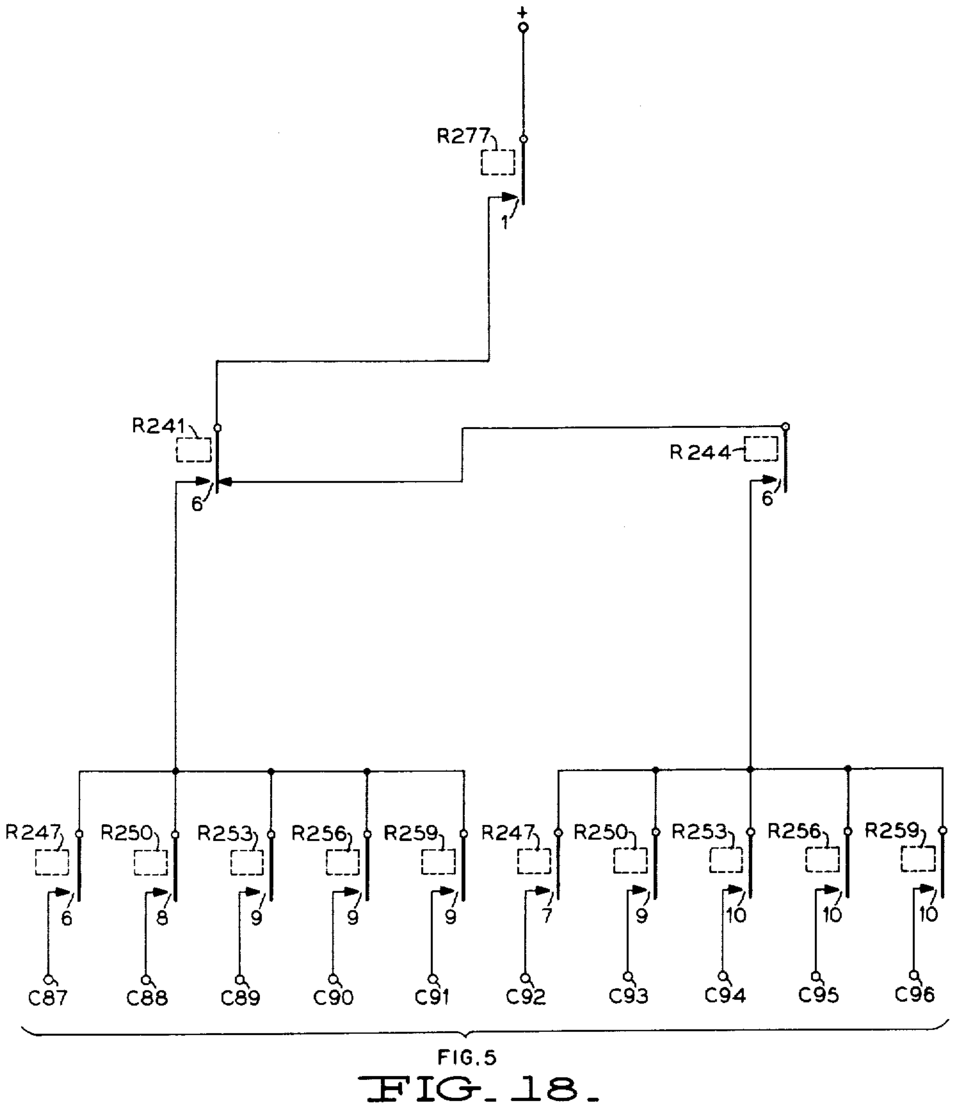

The digit and word select is coupled to the second grid of a series of thyratrons 457–463. The reading heads from the buffer zone of the magnetic drum are connected to the lines 236 through 242 so that information is being read therefrom and is coupled through an inverter 464 and an inverter cathode follower 465 for increased power output. The buffer output is applied to one grid of the thyratrons 457 to 463 so that upon coincidence of the word and digit gating pulse line 456 to the other grid of the thyratrons 457 through 463 the particular digit position desired may be selected. Since the digit output of the drum is in biquinary code, one of the thyratrons 457, 458, and one of the thyratrons 459 through 463 will be picked and a circuit completed from the cathode circuit to the plate circuit to a series of relays as shown in FIG. 17. When two of these relays are picked, the contacts R216–9 and R219–10, which represent the binary bits are picked one or other to complete a circuit to the typewriter check relay R229.

When all the relays R116 to R226, FIG. 9, operated, a circuit was completed to one of the control lines C141 to C150. These control lines are each individually connected to the typewriter to which it is concerned, that is, C141 goes to typewriter 1 and so on to typewriter 10 which is C150. Referring to FIG. 8, it will be seen that the line C141 is connected through the cancel contact 3–2 to the output switch R34. Before this action transpires, it is necessary that the contacts of the binary and quinary bits be proven for the validity check.

The series of contacts shown in FIG. 17 of relays R222 to R226 and relays 216 and 219 operate so that if there is invalid combination, the error relay R230 will be operated, while if there is no error, the typewriter check relay 229 will be operated and complete the circuit as mentioned previously. If there is an error, the relay 230 will be operated, FIG. 30, and the contact 230–2 will be operated through the cathode follower 450 and turn off the tape select latch 416–418 which will initiate the cycle again so that the character 6 will be sensed to see if a valid combination can be obtained.

When the relay R229 is operated, a circuit R229–1, R216–2, 222–3, C141 in FIG. 9 to C141, FIG. 8, R3–2, R28–12 is completed to the relay R34 and the contact points R34–4 through R34–8, FIG. 7, are closed to operate the relays R45, R64, R67, R75 and R70 and R73. The relay contact R34–2 completes a circuit from plus voltage through the output format relay contact R23–3 through the tape interlock contact R24–2 through the escape control point R17–2, through the escape delay R18–1 to the escape magnet 40 which moves the tape to the output format if necessary which when sensed opens the contact R23–3 and the inquiry station typewriter is now in condition to accept the information from the buffer storage.

Figure 22:
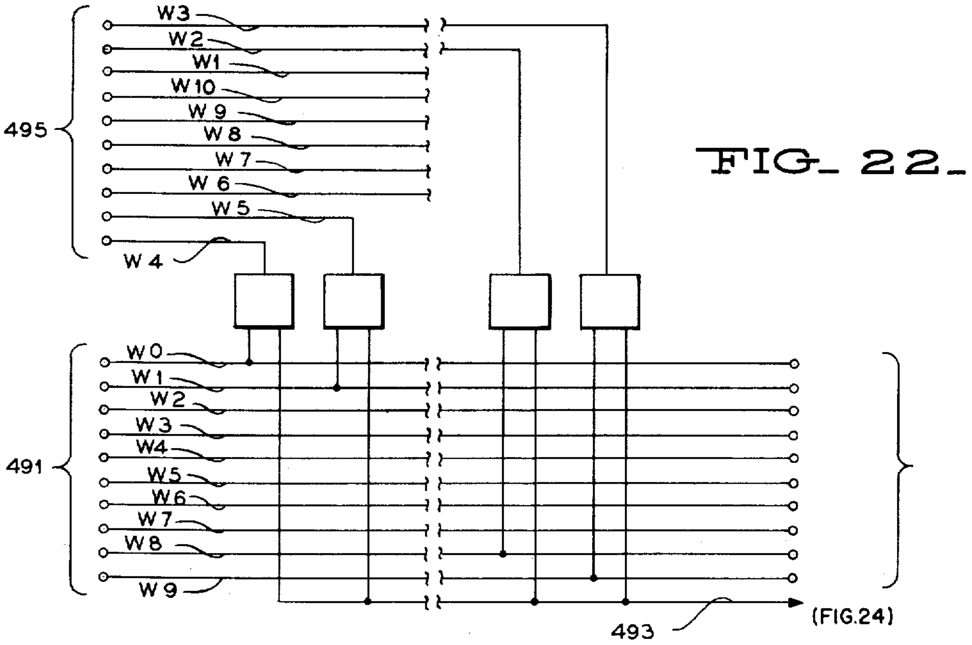
Figure 23:
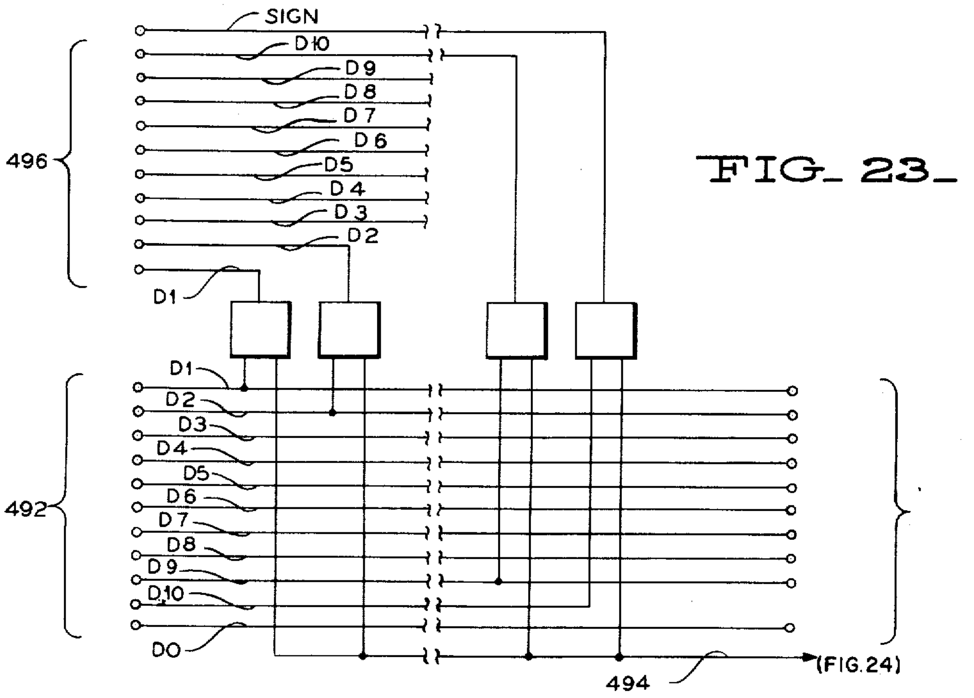

The typing of the data by the typewriter from the output buffer storage unit is controlled by the format tape relays in the same manner the input information was put into the input buffer zone. FIGS. 22 and 23 show the timing pulse lines 491 and 492 with a series of cathode follower mixers having input lines 495 and 496 and a series of cathode follower switches similar to those shown in FIGS. 20 and 21 with an output word line 493 and an output digit line 494. These two lines are applied to the AND gate 500, FIG. 24, along with a line 501 which is the select timer. The character select timer line 501 is up when the line 495 and 496, FIG. 30, is raised so that the cathode follower switch 499 has a raised output which is applied to the latch consisting of 502 through 504. Line 495, FIG. 30, is the output select line while line 496 is a S4 line. The output of cathode follower 504 is then raised and applied to an AND circuit 505. Also applied to AND circuit 505 is line 424 which is the timer, FIG. 28, which is turned on at word 27 time and turned off at word 37. When these lines are up together, the AND circuit 505 has a raised output which couples through the cathode follower 506 and furnishes a plus potential to line 501. Line 429 is a W7 time, line 428 is an S2 time, and line 431 is an S3 time.

The AND circuit 500, FIG. 24, therefore in the interval of words 27 to 37 determines by the output digit and word lines which word in digit will be selected in this interval. When the AND circuit 500 goes up, it is coupled through the OR circuit 507, the inverter 508, the capacitor 509 to a cathode follower 510 to a latch circuit 511 through 513 which is turned On and is used as a digit delay. The output of cathode follower 513 is connected through cathode follower 514 to the AND circuit 515 and coupled through inverters 516 and inverter cathode follower 517. The output of inverter cathode follower 517 is applied to each of one of the grids of the thyratrons 518 to 524. The ouput from the reading heads on the computer are furnished to the other grids of the thyratrons so that upon coincidence of the output digit and word, the thyratrons will fire and furnish an output to lines 525 to line 531. The digit delay, it will be remembered, is used in this case since there the transfer from general storage to buffer storage caused a digit delay so that if we read at digit 37 for the general storage, the digit we desired would be in the next digit position relative to general storage.

Figures 15, 16:
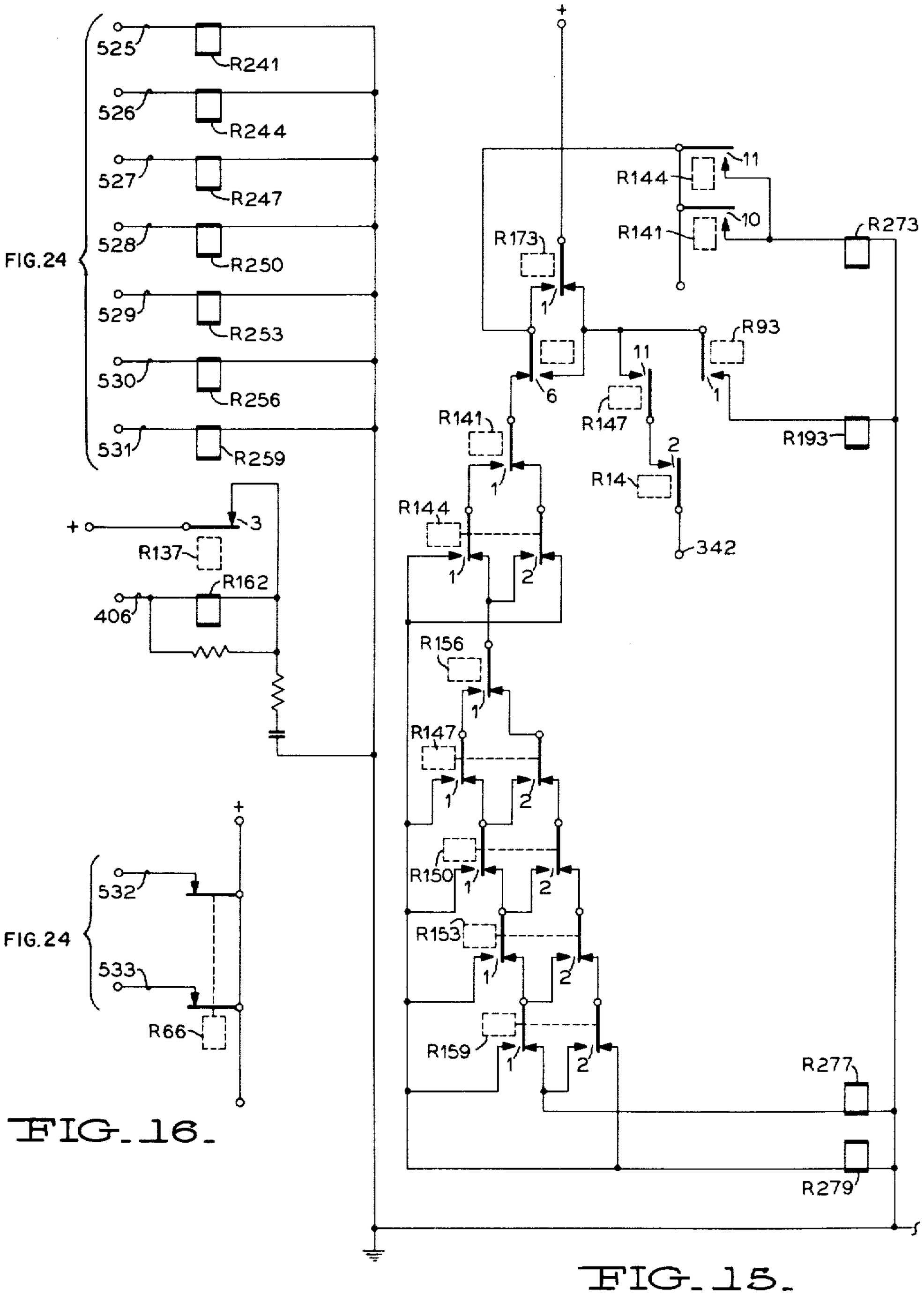

The line 525–531 are connected to the relays R241, R244, R247, R250, R253, R256 and R259, FIG. 15, in a manner similar to the operation of the typewriter selection of relays which in turn set up a digit validity check so that a character check relay 277 or a noncheck relay 279 is operated. The relay point R277–1, FIG. 18, closes and connects plus potential to a relay matrix to which the lines C87 through C96 which represent the digits are connected. The relays, FIG. 17, 241 through R259, determine which of the lines connected to the print magnets C87 through C96 will be operated to print at the given format location. For a noncheck where the relay R279 is closed, a symbol will be printed in red to indicate an error not shown in this specification.

As the print magnets are operated to draw the keys down as shown in FIG. 5, the contact 43 will be closed to furnish potential to the relay R48 and subsequently close the contact R30, R48–2, FIG. 8, which, along with the contact R34–2, completes a circuit to the format tape escape magnet to move the format tape one column.

This process is repeated until all information has been read from the output buffer zone of the magnetic drum.

Figure 31:
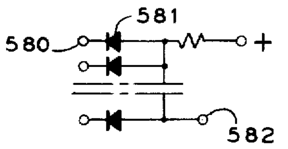
FIGS. 31–45 illustrate the circuitry contained in various boxes shown in the drawings.
Figure 32:
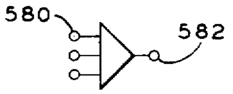

The AND circuit shown in FIG. 32 is shown in detail in FIG. 31 as inputs 580, diodes 581, a source of voltage as indicated and an output 582. When the voltages on lines 580 are all high, the voltage at 582 will be at approximately the same voltage level.

Figure 33:
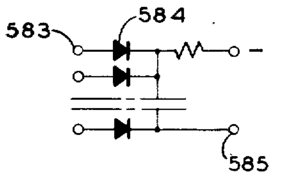
Figure 34:
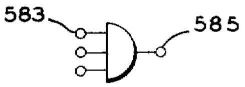

The OR circuit shown in FIGS. 33 and 34 uses a source of negative voltage as shown with the diodes 84 oriented in a forward direction so that a rise in voltage on any or all lines 583 will raise the voltage level on line 585.

Figure 35:
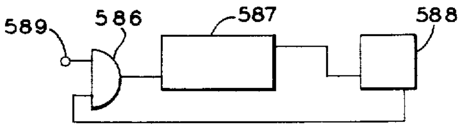

A typical latch circuit is shown in FIG. 35 and consists of an OR circuit, a double inverter 587 and a cathode follower 588 with output coupled back to the OR 586 to the input of the double inverter 587. A latch is said to be On when: the first inverter is conducting; the second inverter is nonconducting and the cathode follower is conducting. Since the cathode follower will have a raised voltage output, the first inverter will be kept conducting and the circuit will be stable. The Off condition is just the reverse of that mentioned. The latch may be set to an On position by a positive pulse on line 589 and reset Off by a negative pulse to the grid of any tube then conducting.

Figure 36:
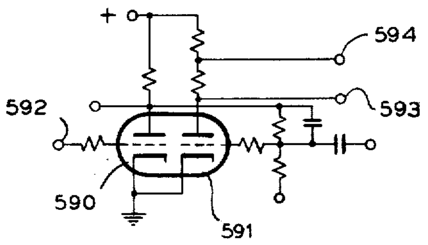
Figure 37:
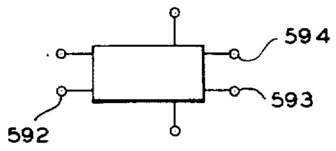

A double inverter is shown in FIGS. 36 and 37 and consists of two triodes 590 and 591 with an input 592. The plate of triode 590 is connected to the grid of triode 591 and the output taken off the plate at 593 or 594.

Figure 38:
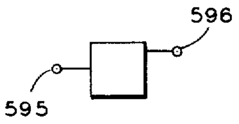
Figure 39:
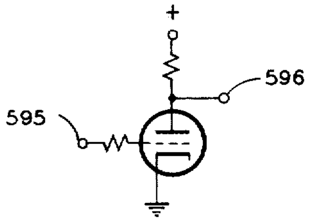

A single inverter is shown in FIGS. 38 and 39 with an input at 595 and an output at 596.

Figure 40:
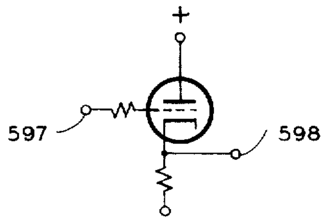
Figure 41:
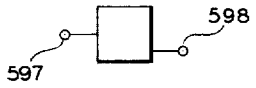

A cathode follower is shown in FIGS. 40 and 41 with an input at 597 and an output at 598.

Figure 42:
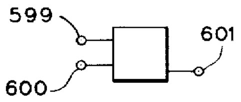
Figure 43:
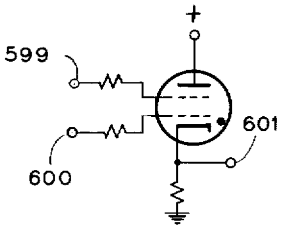

A thyratron is shown in FIGS. 42 and 43 with inputs 599 and 600 which they coincide with a positive voltage cause the thyraton to fire. In the one shown, the output is taken from the cathode at 601.

Figure 44:
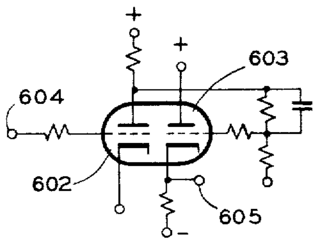
Figure 45:
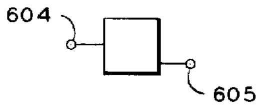

An inverter 602, cathode follower 603 combination is shown in FIGS. 44 and 45 with an input at 604 and output at 605 so that a positive pulse at terminal 604 will appear as a negative pulse at terminal 605.

Figure 46:
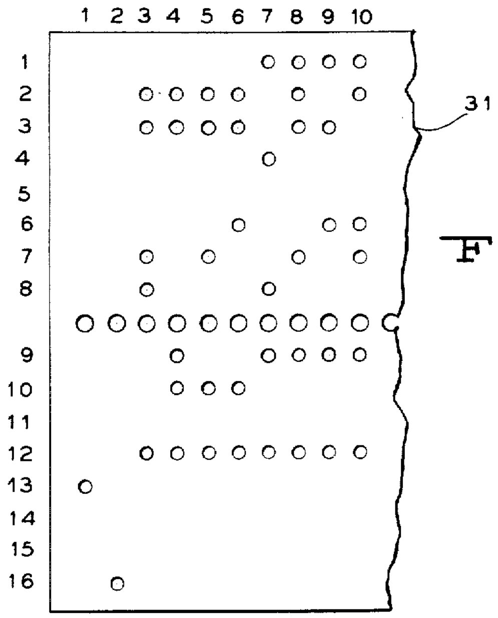
FIG. 46 is a detailed showing of the format tape.

The format tape 31 is shown in FIG. 46 with columns 1–10 illustrated. Rows 1–16 contain the coded information. This portion of the tape represents the input with a punch in row 13 column 1 and a series of control word punches 12 thereafter.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a code transmitter operable to selectively generate variable data manifestations, a register means responsive to said data manifestations to provide a static indication thereof, a storage means having a plurality of data locations to receive said manifestations, means for selecting a particular storage location for each data manifestation from said register, means responsive to the recording of said manifestation for reading the manifestations then recorded and transmitting the same to said register, and means responsive to a mismatch in the static indication of the manifestations contained in said register and the manifestations contained in said storage to provide an indication thereof.

2. In combination, a code transmitter operable to selectively generate variable data manifestations, a register means responsive to said data manifestations to provide a static indication thereof, a storage means having a plurality of data locations to receive said manifestations, means for selecting a particular storage location for each data manifestation from said register, means responsive to the recording of said manifestation for reading the manifestations then recorded and transmitting the same to said register, means responsive to a mismatch in the static indication of the manifestations contained in said register and the manifestations contained in said storage to provide an indication thereof, said register comprises a series of relays selectively operable in response to said data manifestations and having a plurality of contact points operated thereby, circuit means connecting said contact points to said reading means and means completing a circuit with said contact points and operable to indicate an error when said data representations are present on the unoperated relay contact points.

3. In combination, a code transmitter operable to selectively generate variable data manifestations, a register means responsive to said data manifestations to provide a static indication thereof, a storage means having a plurality of data locations to receive said manifestations, means for selecting a particular storage location for each data manifestation from said register, means responsive to the recording of said manifestation for reading the manifestations then recorded and transmitting the same to said register, means responsive to a mismatch in the static indication of the manifestations contained in said register and the manifestations contained in said storage to provide an indication thereof, said register comprises a series of relays selectively operable in response to said data manifestations and having a plurality of contact points operated thereby, circuit means connecting said contact points to said reading means, means completing a circuit with said contact points and operable to indicate an error when said data representations are present on the unoperated relay contact points, each said data manifestation made up of a binary bit and a quinary bit, and said series of relays are divided into two groups to accept a binary and a quinary manifestation with said contact points, each having a normally open and a normally closed point, with the normally closed points of each said group being connected in parallel, an OR circuit connected to said normally open points of each group, and an AND circuit connected to each of said parallel connected closed point whereby an error will be indicated when an output appears at said OR circuit or when there are not two input signals to said AND circuit.

References Cited in the file of this patent

UNITED STATES PATENTS

| | | |
|---|---|---|
| 2,528,394 | Sharpless et al. | Oct. 31, 1950 |
| 2,587,532 | Schmidt | Feb. 27, 1952 |
| 2,604,262 | Phelps et al. | July 22, 1952 |
| 2,608,615 | Oberman | Aug. 26, 1952 |
| 2,622,148 | Van Duuren | Dec. 16, 1952 |
| 2,680,240 | Greenfield | June 1, 1954 |
| 2,688,656 | Wright | Sept. 12, 1954 |
| 2,706,215 | Van Duuren | Apr. 12, 1955 |
| 2,731,196 | Luhn | Jan. 17, 1956 |
| 2,749,037 | Stibitz | June 5, 1956 |
| 2,800,539 | Edminster et al. | July 23, 1957 |
| 2,910,238 | Miles | Oct. 27, 1959 |